(12) United States Patent
Paver et al.

(10) Patent No.: US 7,047,393 B2
(45) Date of Patent: May 16, 2006

(54) COPROCESSOR PROCESSING INSTRUCTION WITH COPROCESSOR ID TO BROADCAST MAIN PROCESSOR REGISTER DATA ELEMENT TO COPROCESSOR MULTI-ELEMENT REGISTER

(75) Inventors: Nigel C. Paver, Austin, TX (US); Wing K. Yu, Chandler, AZ (US); Murli Ganeshan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 10/263,246

(22) Filed: Oct. 2, 2002

(65) Prior Publication Data

US 2004/0030863 A1 Feb. 12, 2004

Related U.S. Application Data

(63) Continuation-in-part of application No. 10/215,756, filed on Aug. 9, 2002, now Pat. No. 6,986,023.

(51) Int. Cl.
*G06F 9/315* (2006.01)
(52) U.S. Cl. ......................................... 712/34; 712/225
(58) Field of Classification Search ................. 712/34, 712/225, 300
See application file for complete search history.

(56) References Cited

U.S. PATENT DOCUMENTS 4,873,630 A * 10/1989 Rusterholz et al. ............ 712/3
4,894,768 A     1/1990 Iwasaki et al. ............... 712/34
5,073,864 A * 12/1991 Methvin et al. ............. 708/212
5,420,809 A *  5/1995 Read et al. .................. 708/200
5,696,985 A * 12/1997 Crump et al. ................. 712/36
5,822,619 A * 10/1998 Sidwell ....................... 712/300

(Continued)

OTHER PUBLICATIONS

R.B. Grant et al., *The Scalable Processor Architecture (SPARC)*, Intellectual Leverage, San Francisco, Feb. 29-Mar. 4, 1988, Computer Society International Conference Washington, IEEE Comp. Soc. Press, US, vol. Conf. 33, Feb. 29, 1988, pp. 278-283.

(Continued)

*Primary Examiner*—Kenneth S. Kim
(74) *Attorney, Agent, or Firm*—Trop, Pruner & Hu PC

(57) ABSTRACT

A processor-based system may include a main processor and a coprocessor. The coprocessor handles instructions that include opcodes specifying a data processing operation to be performed by the coprocessor and a coprocessor identification field for identifying a target coprocessor for coprocessor instructions. Two bits indicate one of four data sizes including a byte (8 bits), a half word (16 bits), a word (32 bits), and a double word (64 bits). Two other bits indicate a saturation type. A source register in the main processor and a destination register is in the coprocessor, those registers including data elements. The coprocessor instruction includes an opcode specifying a data processing operation to be performed by the coprocessor and a coprocessor identification field for identifying a target coprocessor for the coprocessor instruction, the instruction to broadcast a data element from said source register to said destination register.

27 Claims, 20 Drawing Sheets

U.S. PATENT DOCUMENTS

| | | | |
|---|---|---|---|
| 5,838,984 A * | 11/1998 | Nguyen et al. | 712/5 |
| 5,933,650 A * | 8/1999 | van Hook et al. | 712/2 |
| 5,996,057 A * | 11/1999 | Scales et al. | 712/5 |
| 6,006,315 A * | 12/1999 | Park | 712/7 |
| 6,298,438 B1 | 10/2001 | Thayer et al. | 712/226 |
| 6,332,186 B1 | 12/2001 | Elwood et al. | 711/217 |
| 6,671,797 B1 * | 12/2003 | Golston | 712/224 |
| 2003/0093648 A1 * | 5/2003 | Moyer | 712/34 |
| 2003/0120903 A1 * | 6/2003 | Roussel | 712/221 |
| 2003/0221089 A1 * | 11/2003 | Spracklen | 712/221 |

OTHER PUBLICATIONS

Paver et al., U.S. Appl. No. 10/215,756, filed Aug. 9, 2002, entitled "Multimedia Coprocessor Control Mechanism".

* cited by examiner

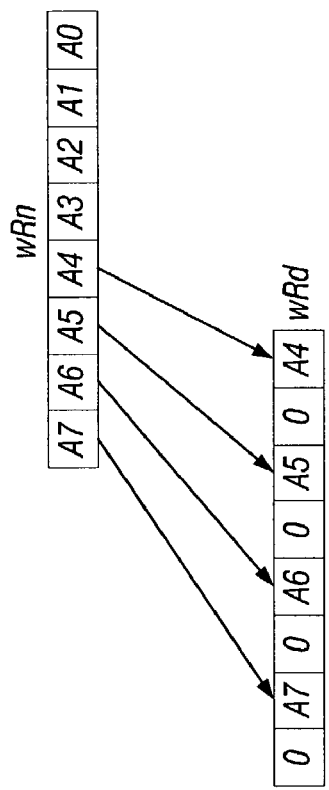
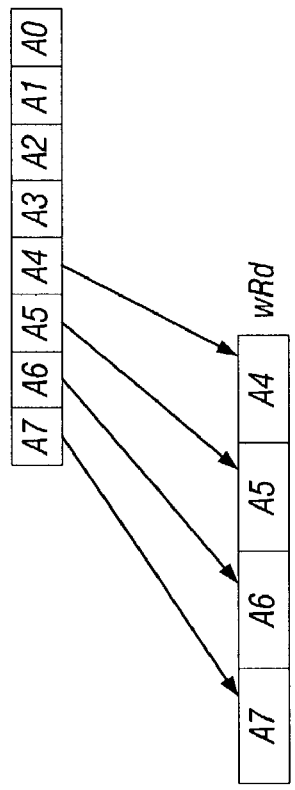
FIG. 10A
FIG. 10B

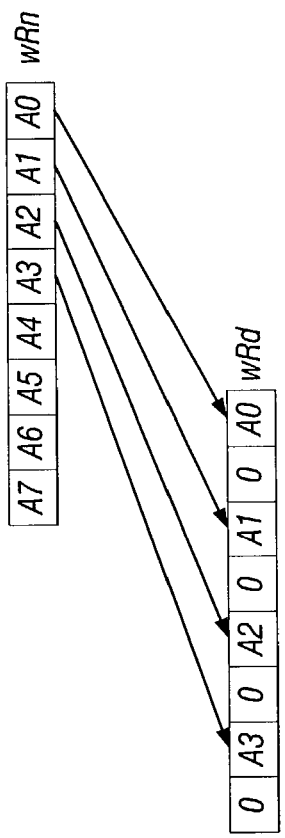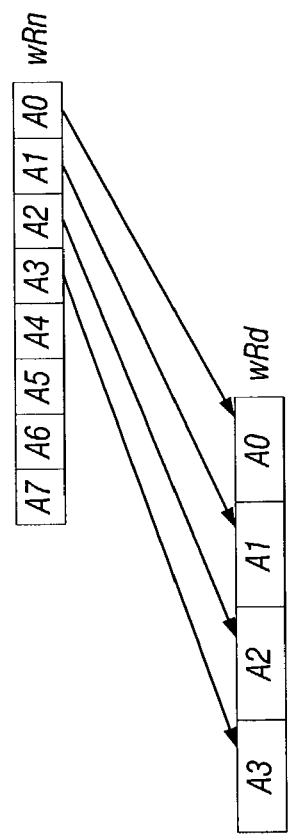

COPROCESSOR PROCESSING INSTRUCTION WITH COPROCESSOR ID TO BROADCAST MAIN PROCESSOR REGISTER DATA ELEMENT TO COPROCESSOR MULTI-ELEMENT REGISTER

CROSS-REFERENCE TO RELATED APPLICATION

This is a continuation-in-part of U.S. patent application Ser. No. 10/215,756, filed on Aug. 9, 2002 now U.S. Pat. No. 6,986,023.

BACKGROUND

This invention relates to the field of data processing. More particularly, this invention relates to data processing systems incorporating coprocessors.

It is known to provide data processing systems incorporating both main processors and a coprocessor. In some systems it is known to be able to provide one or more different coprocessors with a main processor. In this case, the different coprocessors can be distinguished by different coprocessor numbers.

A coprocessor instruction encountered in the instruction data stream of the main processor is issued on a bus coupled to the coprocessor. The one or more coprocessors (that each have an associated hardwired coprocessor number) attached to the bus examine the coprocessor number field of the instruction to determine whether or not they are the target coprocessor for that instruction. If they are the target coprocessor, then they issue an accept signal to the main processor. If the main processor does not receive an accept signal, then it can enter an exception state to deal with the undefined instruction.

Given that the coprocessor instructions are a subset of the main processor instructions, in many circumstances instruction bit space is limited for the coprocessor. These problems are made worse if the coprocessor requires a rich instruction set with a large number of wide operations.

Thus, there is a need for better ways to formulate instructions for coprocessors.

BRIEF DESCRIPTION OF THE DRAWINGS

FIG. 10A is a depiction of another operation in accordance with one embodiment of the present invention;

FIG. 10B is a depiction of another operation in accordance with one embodiment of the present invention;

FIG. 12A is a depiction of yet another operation in accordance with one embodiment of the present invention;

FIG. 12B is a depiction of another operation in accordance with one embodiment of the present invention;

DETAILED DESCRIPTION

Figure 1:
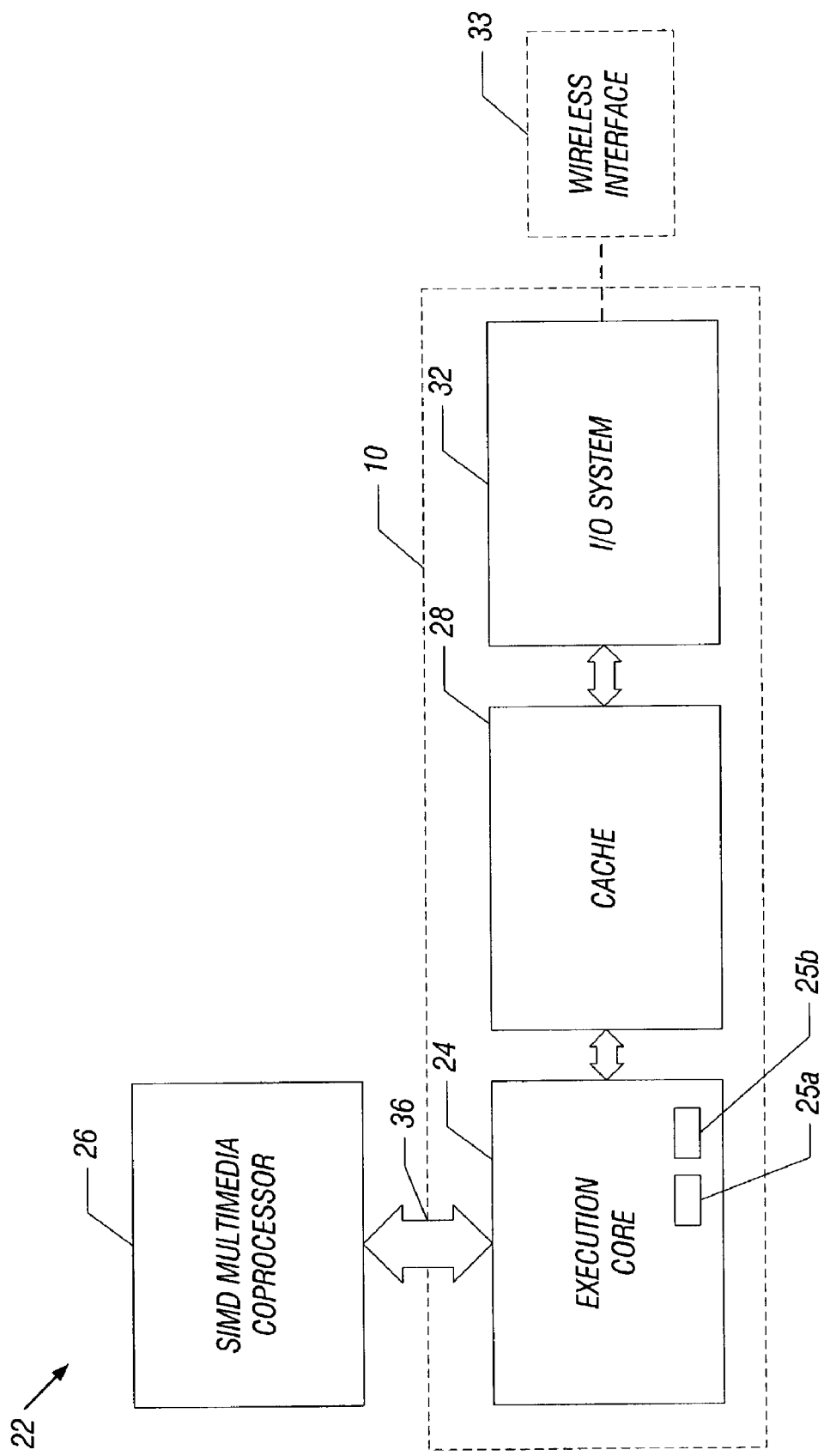
FIG. 1 schematically illustrates a data processing system in accordance with one embodiment of the present invention.

A data processing system 22 may include a main processor or execution core 24, a multimedia coprocessor 26, a cache memory 28 and an input/output system 32 as shown in FIG. 1 in accordance with one embodiment of the present invention. The input/output system 32 may be coupled to a wireless interface 33 in one embodiment of the present invention.

In operation, the main processor 24 executes a stream of data processing instructions that control data processing operations of a general type including interactions with the cache memory 28, and the input/output system 32. Embedded within the stream of data processing instructions are coprocessor instructions. The main processor 24 recognizes these coprocessor instructions as being of a type that should be executed by an attached coprocessor 26. Accordingly, the main processor 24 issues these coprocessor instructions on the coprocessor bus 36 from where they are received by any attached coprocessors. In this case, the coprocessor 26 will accept and execute any received coprocessor instructions that it detects are intended for it. This detection is via the combination of a coprocessor number field and valid instruction encoding for the designated coprocessor, within the coprocessor instruction.

Figure 2:
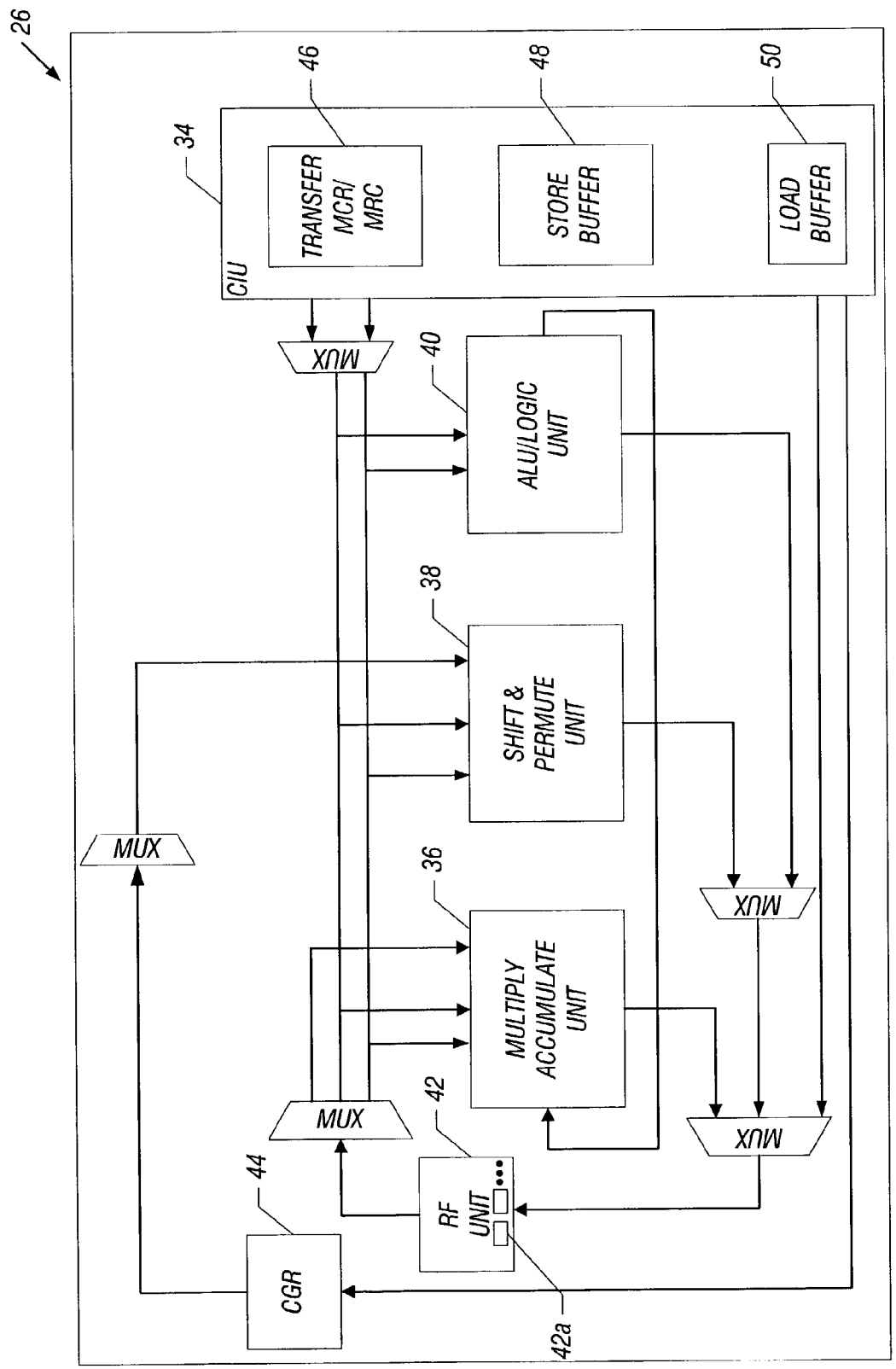
FIG. 2 illustrates a coprocessor in accordance with one embodiment of the present invention.

Referring to FIG. 2, the multimedia coprocessor 26 may include a coprocessor interface unit (CIU) 34 including a transfer buffer 46. The transfer buffer 46 may facilitate transfers to a coprocessor register (MCR) and transfers from a coprocessor (MRC). The CIU 34 may also include a store buffer 48 and a load buffer 50. The CIU 34 communicates with a multiply accumulate unit 36, a shift and permute unit 38, and an arithmetic logic unit (ALU)/logic unit 40. The CGR 44 contains auxiliary registers. A plurality of multiplexers (MUX) facilitate the data transfer between various units.

A register file (RF) unit 42 may include a plurality of registers. In one embodiment, the RF unit 42 may include sixteen registers. For each instruction, three registers 42a may be assigned. In some embodiments of the present invention two source registers and one destination register 42a may be assigned to each instruction. The primary source register may be designated wRn, the secondary source register may be designated wRm, and the destination register may be designated wRd in accordance with one embodiment of the present invention.

Coprocessor instructions can be conditionally executed. Conditionally executed means that the instructions have a condition that is checked by determining if the main processor arithmetic flags 25a and 25b in FIG. 1, match the specified condition.

Figures 3, 7:
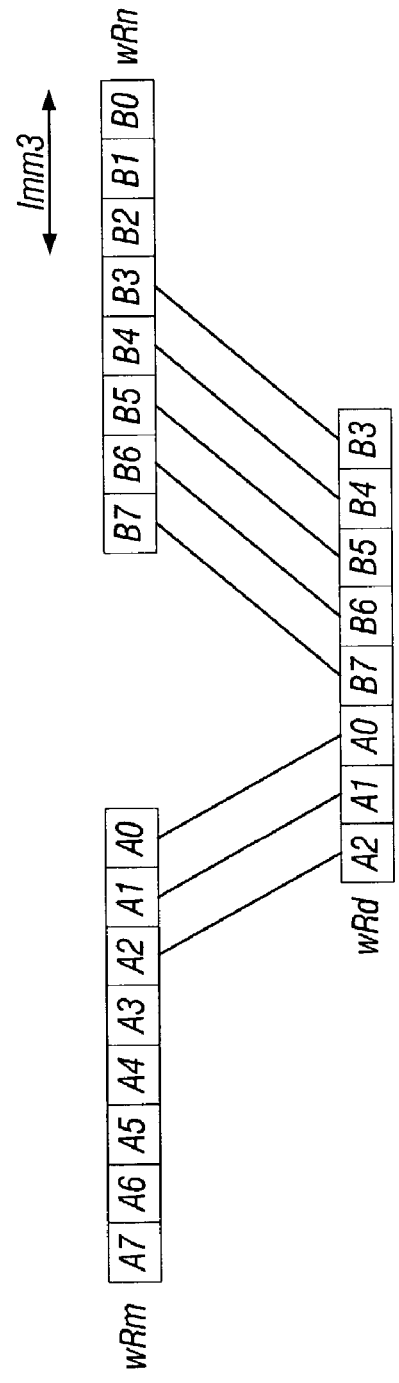
FIG. 3 is a depiction of a bit sequence for an operation in accordance with one embodiment of the present invention.
FIG. 7 is a depiction of one operation in accordance with one embodiment of the present invention.

Turning next to FIG. 3, in some embodiments, 64 bit single instruction multiple data (SIMD) arithmetic operations may be performed through a coprocessor data processing (CDP) instruction. Three operand instructions may be used, including two source and one destination operand. The coprocessor can operate on 8, 16, 32, and 64 bit values and may be executed conditionally, in some embodiments. In some cases, addition and subtraction can be performed, as well as addition with carry. Zero, negative, carry, and overflow detection can be done on all SIMD fields. Also, signed saturation to the SIMD field width can be performed together with unsigned saturation.

The add instruction performs vector addition of source register (wRn and wRm) contents for vectors of 8, 16, or 32 bit signed or unsigned data. The instruction places the result in a destination register wRd. Saturation can be specified as signed, unsigned, or no saturation.

Saturation relates to what happens when the number of bits that result from an operation exceed the available capacity. With no saturation, only the lower bits of the result are presented. With unsigned saturation (US), the bits from zero to the maximum capacity may be presented. With signed saturation (SS), bits from the maximum positive to the maximum negative values are presented. In the pseudocode that follows the saturation types SS and US are indicated in curly brackets to indicate they are optional.

The size of the operand may be a byte or 8 bits, a half word or 16 bits, or a word or 32 bits. In some contexts 16 bits may be called a word, 32 bits a double word, and 64 bits a quad word. In the case of a byte SIMD, each numbered byte position in the destination register (wRd) is the result of saturating the sum of the same byte positions in the source registers (wRn and wRm) to the designated data size (e.g., 8 for a byte size):

wRd[byte 7 ]=saturate(wRn[byte 7 ]+wRm[byte 7 ], {US,SS}, 8)
wRd[byte 6 ]=saturate(wRn[byte 6 ]+wRm[byte 6 ], {US,SS}, 8)
wRd[byte 5 ]=saturate(wRn[byte 5 ]+wRm[byte 5 ], {US,SS}, 8)
wRd[byte 4 ]=saturate(wRn[byte 4 ]+wRm[byte 4 ], {US,SS}, 8)
wrd[byte 3 ]=saturate(wRn[byte 3 ]+wRm[byte 3 ], {US,SS}, 8)
wRd[byte 2 ]=saturate(wRn[byte 2 ]+wRm[byte 2 ], {US,SS}, 8)
wRd[byte 1 ]=saturate(wRn[byte 1 ]+wRm[byte 1 ], {US,SS}, 8)
wRd[byte 0 ]=saturate(wRn[byte 0 ]+wRm[byte 0 ], {US,SS}, 8)

In the case of a half word:
wRd[half 3 ]=saturate(wRn[half 3 ]+wRm[half 3 ], {US,SS}, 16)
wRd[half 2 ]=saturate(wRn[half 2 ]+wRm[half 2 ], {US,SS}, 16)
wRd[half 1 ]=saturate(wRn[half 1 ]+wRm[half 1 ], {US,SS}, 16)
wRd[half 0 ]=saturate(wRn[half 0 ]+wRm[half 0 ], {US,SS}, 16)

Finally, if a word SIMD is identified:
wRd[word 1]=saturate(wRn[word 1]+wRm[word 1], {US,SS}, 32)
wRd[word 0]=saturate(wRn[word 0]+wRm[word 0], {US,SS}, 32)

The resulting encoding results in a 32 bit instruction where bits 0 through 3 are for the wRm source register, the bit 4 is zero, the bits 5 through 7 identify the operation, which in the case of an add instruction is 100. The bits 8 through 11 identify the coprocessor number that is one in this context. The bits 12 through 15 give the destination register, while the bits 16 through 19 are for the source register wRn.

The bits 20 and 21 provide the saturation type. For no saturation the bits are 00, for unsigned saturation (US) they are 01, and for signed saturation (SS) they are 11. The bits 22 and 23 provide the size of the operand. For a one byte sized operand, the bits 22 and 23 are 00, for a half word the bits are 01, and for a word, the bits are 10. The bits 24 through 27 may be 1110 indicating a coprocessor operation. The ensuing discussion assumes that bits 27 through 24 are 1110, specifying a coprocessor instruction. The bits 28 through 31 indicate whether conditional execution is applicable. Conditional execution may be optionally specified.

The subtraction operation performs vector subtraction of wRm from wRn for vectors of 8, 16, or 32 bits, signed or unsigned data, and places the result in wRd. Again, saturation can be specified. For the situation where the SIMD is 8 bits or one byte:

wRd[byte 7 ]=saturate(wRn[byte 7 ]−wRm[byte 7 ], {US,SS}, 8)
wRd[byte 6 ]=saturate(wRn[byte 6 ]−wRm[byte 6 ], {US,SS}, 8)
wRd[byte 5 ]=saturate(wRn[byte 5 ]−wRm[byte 5 ], {US,SS}, 8)
wRd[byte 4 ]=saturate(wRn[byte 4 ]−wRm[byte 4 ], {US,SS}, 8)
wRd[byte 3 ]=saturate(wRn[byte 3 ]−wRm[byte 3 ], {US,SS}, 8)
wRd[byte 2 ]=saturate(wRn[byte 2 ]−wRm[byte 2 ], {US,SS}, 8)
wRd[byte 1 ]=saturate(wRn[byte 1 ]−wRm[byte 1 ], {US,SS}, 8)
wRd[byte 0 ]=saturate(wRn[byte 0 ]−wRm[byte 0 ], {US,SS}, 8)

If the instruction is a half word:
wRd[half 3 ]=saturate(wRn[half 3 ]−wRm[half 3 ], {US,SS}, 16)
wRd[half 2 ]=saturate(wRn[half 2 ]−wRm[half 2 ], {US,SS}, 16)
wrd[half 1 ]=saturate(wRn[half 1 ]−wRm[half 1 ], {US,SS}, 16)
wRd[half 0 ]=saturate(wRn[half 0 ]−wRm[half 0 ], {US,SS}, 16)

Finally, if a word is specified:
wRd[word 1]=saturate(wRn[word 1]−wRm[word 1], {US,SS}, 32)

wRd[word 0]=saturate(wRn[word 0]−wRm[word 0], {US,SS}, 32)

The coding is as described previously for the add operation, except that bits 5 through 7 may indicate 101, which identifies a vector subtraction.

Figure 4:
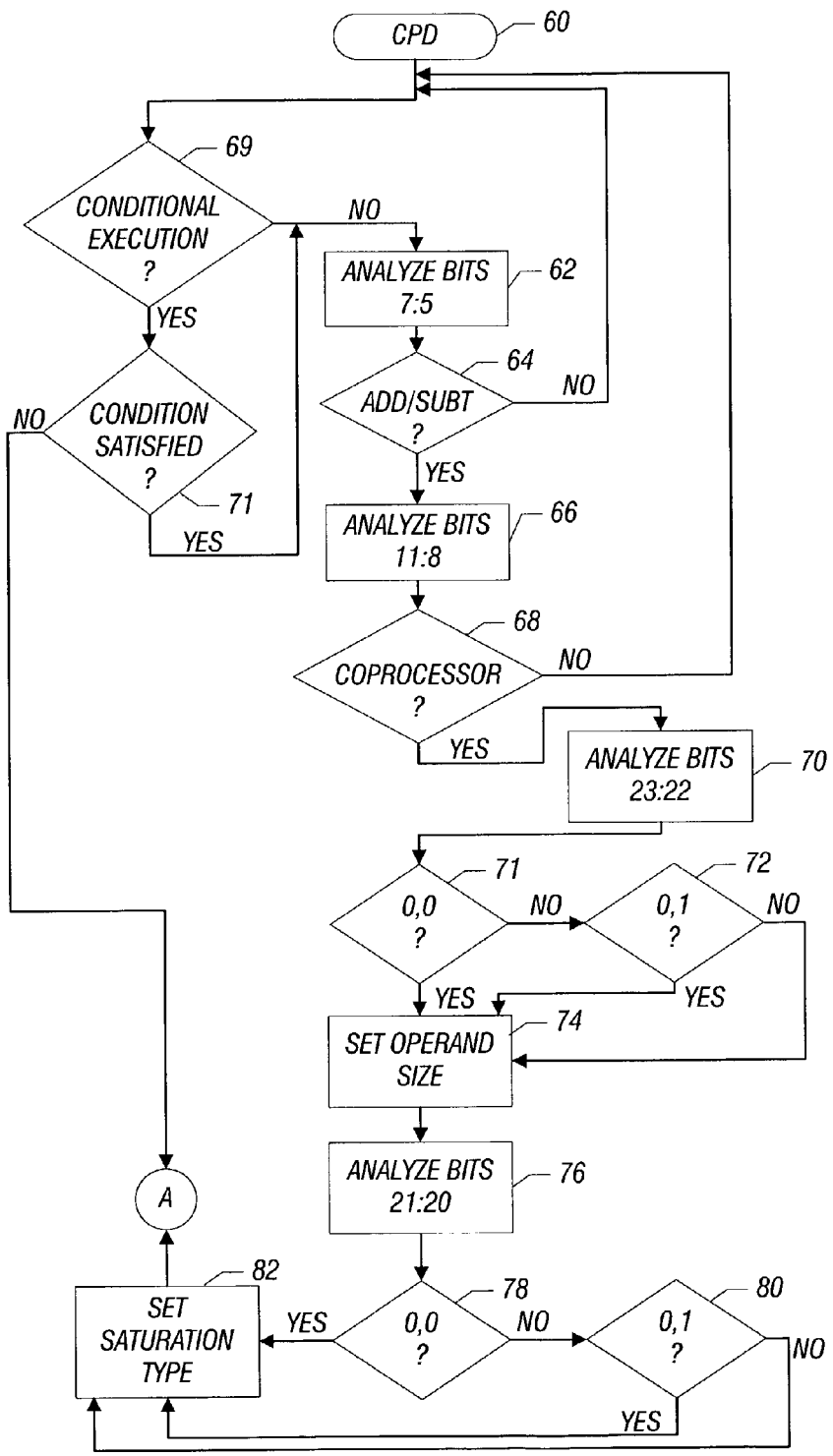
FIG. 4 is a flow diagram according to one embodiment of the present invention.

Thus, referring to FIG. 4, in the case of an add or subtract instruction, at block 62 the bits 5 through 7 are analyzed to determine whether or not an add or subtract instruction is involved. The bits for an add instruction is 100 and for a subtract instruction they are at 101. If an add or subtract is involved, the bits 8 through 11 are analyzed as determined in block 66. A check at diamond 68 determines whether the analyzed bits indicate that the multimedia coprocessor is specified. If so, a check at diamond 69 determines if conditional execution was specified. If so, a check at diamond 71 determines the state of a flag in an arithmetic register 25. If the flag indicates the condition is satisfied, instruction execution continues; otherwise, the flow moves to the next instruction.

The bits 22 and 23 may be analyzed at block 70. If the bits are zero and zero, as determined at diamond 71, then the operand size is a byte. Similarly, if the bits are zero and one, as determined at diamond 72, the operand size is a half word, and otherwise the instruction is invalid (bits 22 and 23 are both one) or the operand size is a full word. In the flow, the invalid option is omitted for clarity both here and for ensuing instructions. The size is set in block 74.

Next, the bits 20 and 21 are analyzed at block 76. If those bits are zero and zero, as determined in diamond 78, then no saturation is utilized. Similarly, if the bits are zero and one, as determined in diamond 80, then unsigned saturation is provided. Otherwise, signed saturation is provided. The appropriate saturation type is set at block 82.

For logic operations, the bits 11 through 8, 7 through 5, and 23 through 22 are all zero. The value 00 in bit positions 21 to 20 determines an OR function, the value 01 in bit positions 21 to 20 determines an exclusive OR function, the value 10 in bit positions 21 to 20 determines an AND function and the value 11 in bit positions 21 to 20 determines an ANDN function. In the AND function, the coprocessor performs a bitwise logical AND between wRn and wRm and places the result in the destination register wRd. In the OR function, the coprocessor performs a bitwise logical OR between wRn and not wRm and places the result in the destination register wRd. In an ANDN function, the coprocessor performs a bitwise logical AND between wRn and not wRm and places the result in the destination register wRd. In the exclusive OR (XOR) function, the coprocessor performs a bitwise logical exclusive OR between wRn and wRm and places the result in wRd. Conditional execution may be specified and implemented as shown in connection with FIG. 4, for example.

Figure 5:
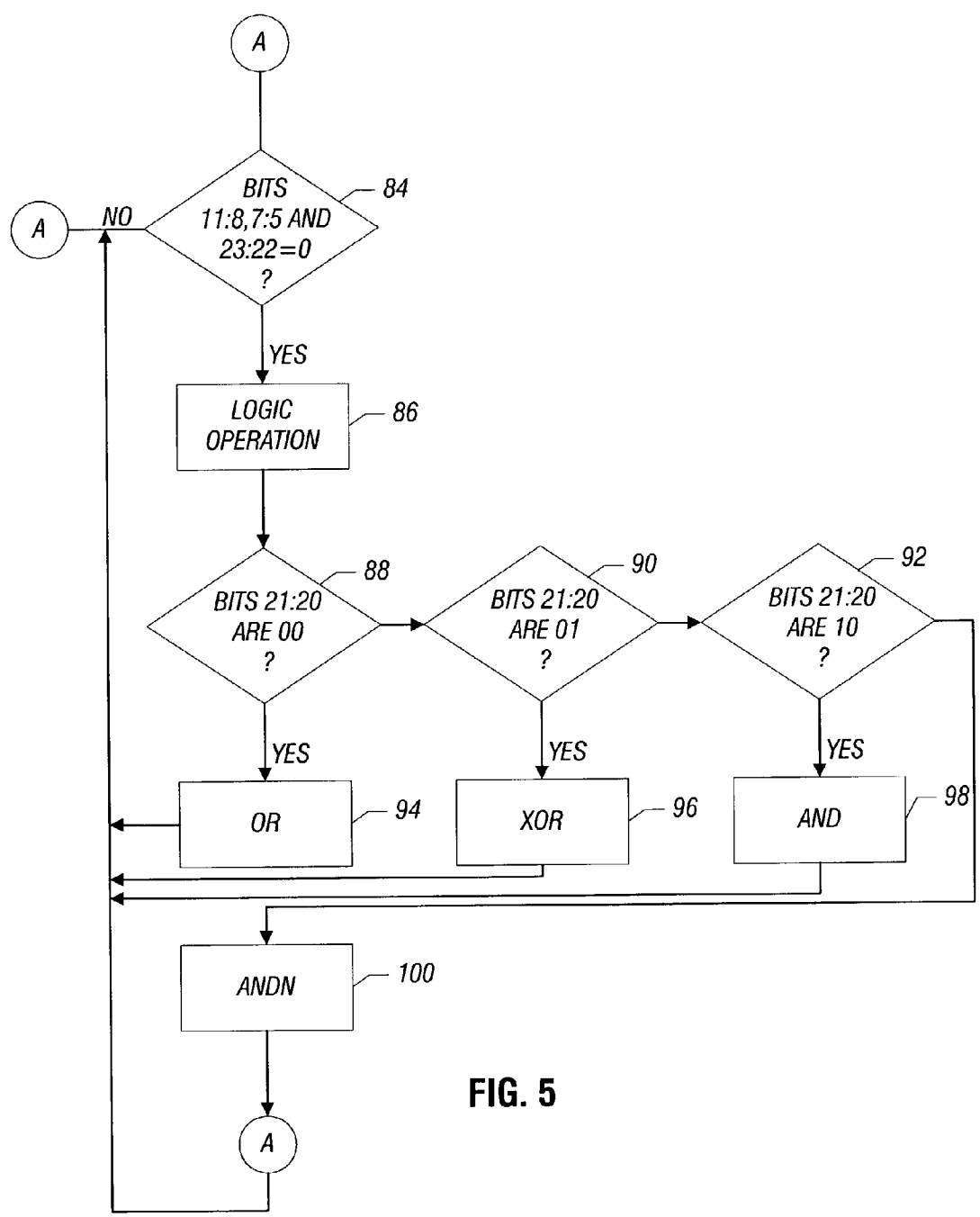
FIG. 5 is a flow chart for a logic operation in accordance with one embodiment of the present invention.

Referring to FIG. 5, at diamond 84 a check determines whether or not the bit pattern corresponds to a logic operation. If not, the flow goes on to another module, but, otherwise, a logic operation is performed as indicated at 86. At diamonds 88, 90, and 92 a determination is made as to what type of logic operation applies based on the bits 21 and 20.

The alignment operation performs a useful function for handling data not stored in memory on a 64-bit boundary. For example, a technology may only be able to load 64-bit, double word data from 64-bit aligned addresses. Therefore, if an unaligned value is required, the two 64-bit aligned double words that the unaligned value straddles are loaded into the register file and an alignment instruction is used to extract the exact 64 bits required. This saves the traditional approach of shifting and masking values to extract the correct alignment. The alignment instruction can extract any 64-bit value on a byte boundary from the two source registers.

FIG. 7 shows an example of the application of the alignment instruction. In this example, the data required is a 64-bit value from address 0x103, which is not a 64-bit aligned address. To get this value the double word data from address 0x100 is loaded into the right source register and double word data from address 0x108 is loaded into the left source register. The alignment instruction is used with a specified offset of three. This cases 5 bytes from the right register (bytes from addresses 0x103–0x107) to be extracted and combined with the lower three bytes of the left register (bytes from addresses 0x108–0x10A). Thus, after the alignment instruction executes, the destination contains the desired data from address 0x103 to 0x10A, i.e. the 64-bit value at address 0x103.

The alignment offset can either be specified as an immediate using the immediate form of the instruction or by using the register format and placing the alignment offset in a wCGRx auxiliary register. The latter is useful if the address offset is created by masking off the lower bits of the access address and then transferred to the wCGR registers. Thus, referring to FIG. 7, an example is given with immediate alignment mode (IMM) bits 20 through 22 equal to three, specifying the byte offset of the value to extract.

The immediate alignment instruction is useful when the sequence of alignment is known beforehand as with the single-sample finite impulse response (FIR) filter. The register alignment instruction is useful when sequence of alignments are calculated when the algorithm executes as with the fast motion search algorithms used in video compression. Both of these instructions operate on register pairs which may be effectively ping-ponged with alternate loads reducing the alignment overhead significantly.

In an alignment operation, the bits 8 through 11 are zero and the bits 5 through 7 are 001. The coprocessor uses a value 10 in the bit positions 23 and 22 to determine the register alignment value to be used. The value zero in bit position 23 determines the immediate alignment value to be used. In the register alignment mode, the bit 21 and the bit 20 determine, via CGR 44 (FIG. 2), which of four auxiliary registers to use for the alignment value.

In immediate alignment mode, the bits 20 through 22 determine the alignment offset (between zero and seven). In an immediate align, the coprocessor extracts the 64 bit value from the two 64 bit source registers ((wRn (at bits 16 through 19) and wRm (at bits 0 through 3)) and places the result in the destination register wRd (at bits 12 through 15). The instruction uses a three bit intermediate value to specify the byte offset of the value to extract. As is the case with other instructions, bit 4 is zero, bits 24 through 27 are 1110, and bits 28 through 31 are used for conditional execution.

Figure 6:
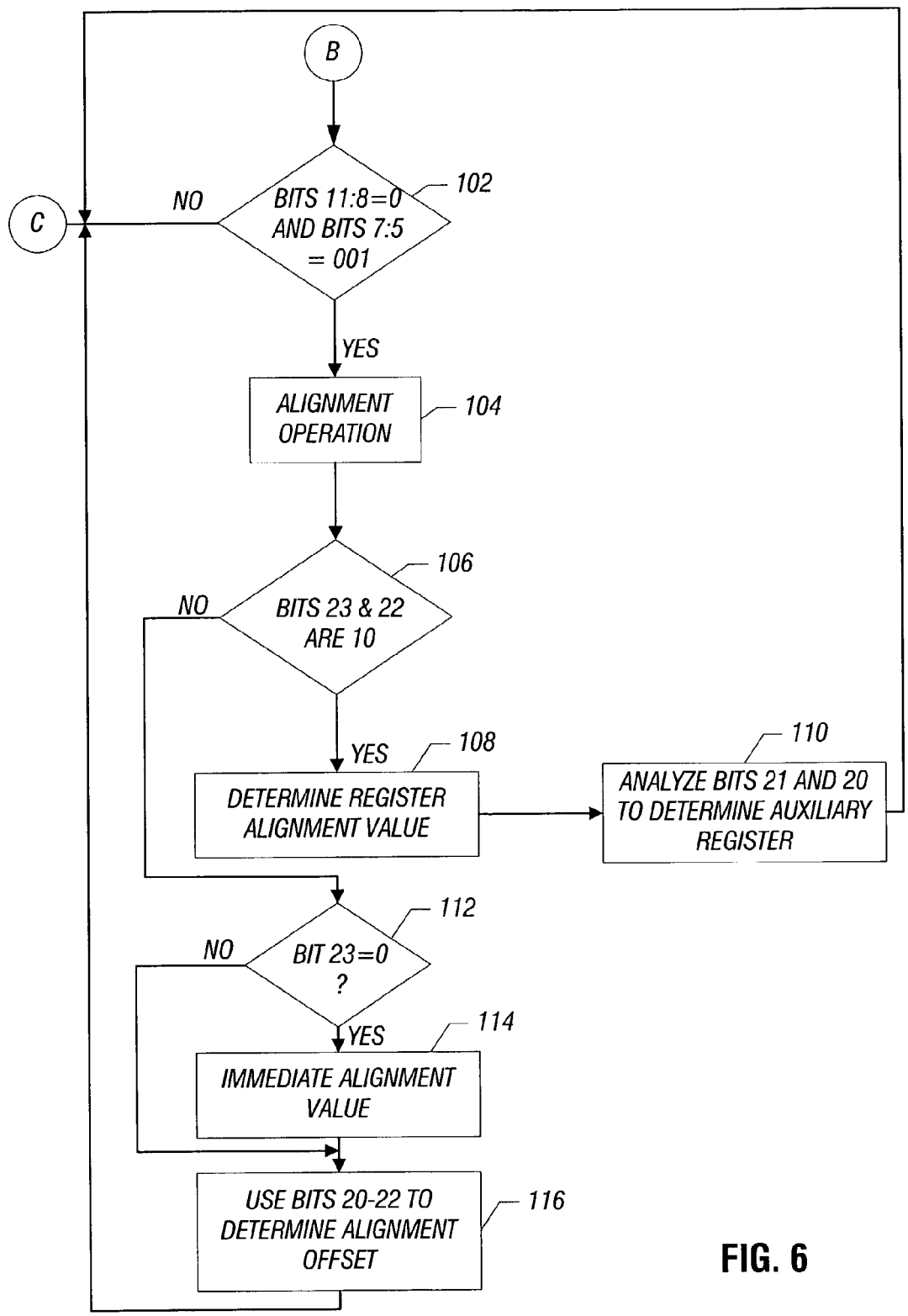
FIG. 6 is a flow chart for an alignment operation in accordance with one embodiment of the present invention.

Referring to FIG. 6, a check at diamond 112 determines whether an alignment operation is specified based on the bit pattern. A check in diamond 106 determines whether the bits determine the register alignment value, which is set in blocks 108 and 110. If not, a check at diamond 112 determines whether the bit 23 is equal to zero, indicating an immediate alignment value, which is set in block 114. In block 116, the bits 20 through 22 are used to determine the alignment offset. Conditional execution may be specified and implemented as shown in FIG. 4, for example.

The register alignment operation extracts a 64 bit value from two 64 bit source registers (wRn and wRm) and places the result in the destination register wRd. The instruction uses a 3 bit value stored in the specified general purpose register to specify the offset of the value to extract.

Figure 22:
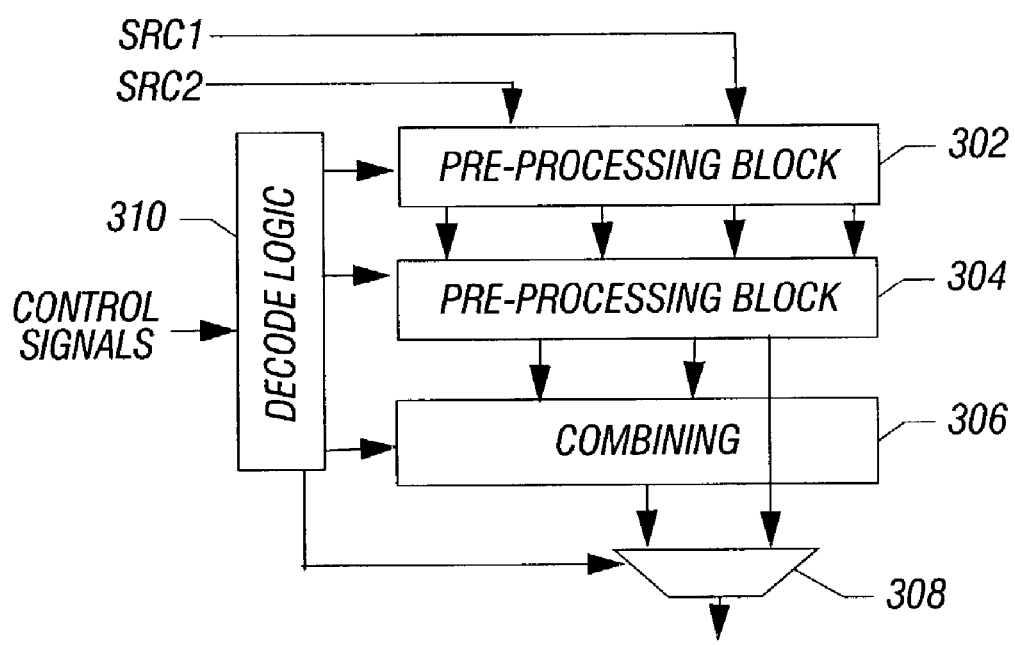
FIG. 22 is a schematic depiction of one embodiment of a permuter for the shift and permute unit shown in FIG. 2.

Referring to FIG. 22, permuter 300, which may be part of the shift and permute unit 38, may handle the alignment operation. The permuter 300 receives operands from the source registers (SRC1 and SRC2) at pre-processing blocks 302 and 304. The blocks 302 and 304 may be realized by a set of multiplexers in one embodiment.

Decode logic 310 receives the control signals which specify either immediate or register alignment as well as the immediate or offset values. The information is combined in combining section 306 and multiplexed by multiplexer 308.

The sum of the absolute differences (SAD) may be performed between wRn and wRm and the result is accumulated with wRd. The sum of absolute differences can be applied to 8 or 16 bit unsigned data vectors and accumulates the results of SIMD parallel absolute difference calculations. The bits 11 through 8 must be 0001. The bits 7 through 5 must be 001, and the bits 23 and 21 must be zero. The bit 20 is used to determine whether to zero an accumulator first. Conditional execution may be specified and implemented as shown in FIG. 4, for example. The bit 22 is used to determine byte or half word SIMD calculations. wRd[word 1]=0 if B is specified. Z may be specified to indicate to zero the accumulator first, then:

```
wRd[word 0] = (Z Specified)?0: wRd[word 0]
    +abs(wRn[byte 7]-wRm[byte 7])
+abs(wRn[byte 6]-wRm[byte 6])
+abs(wRn[byte 5]-wRm[byte 5])
+abs(wRn[byte 4]-wRm[byte 4])
+abs(wRn[byte 3]-wRm[byte 3])
+abs(wRn[byte 2]-wRm[byte 2])
+abs(wRn[byte 1]-wRm[byte 1])
+abs(wRn[byte 0]-wRm[byte 0])
```

If H is specified, indicating a half word SIMD, then:

```
wRd[word 0] = (Z Specified)?0: wRd[word 0]
    +abs(wRn[half 3]-wRm[half 3])
    +abs(wRn[half 2]-wRm[half 2])
    +abs(wRn[half 1]-wRm[half 1])
    +abs(wRn[half 0]-wRm[half 0])
```

Figure 8:
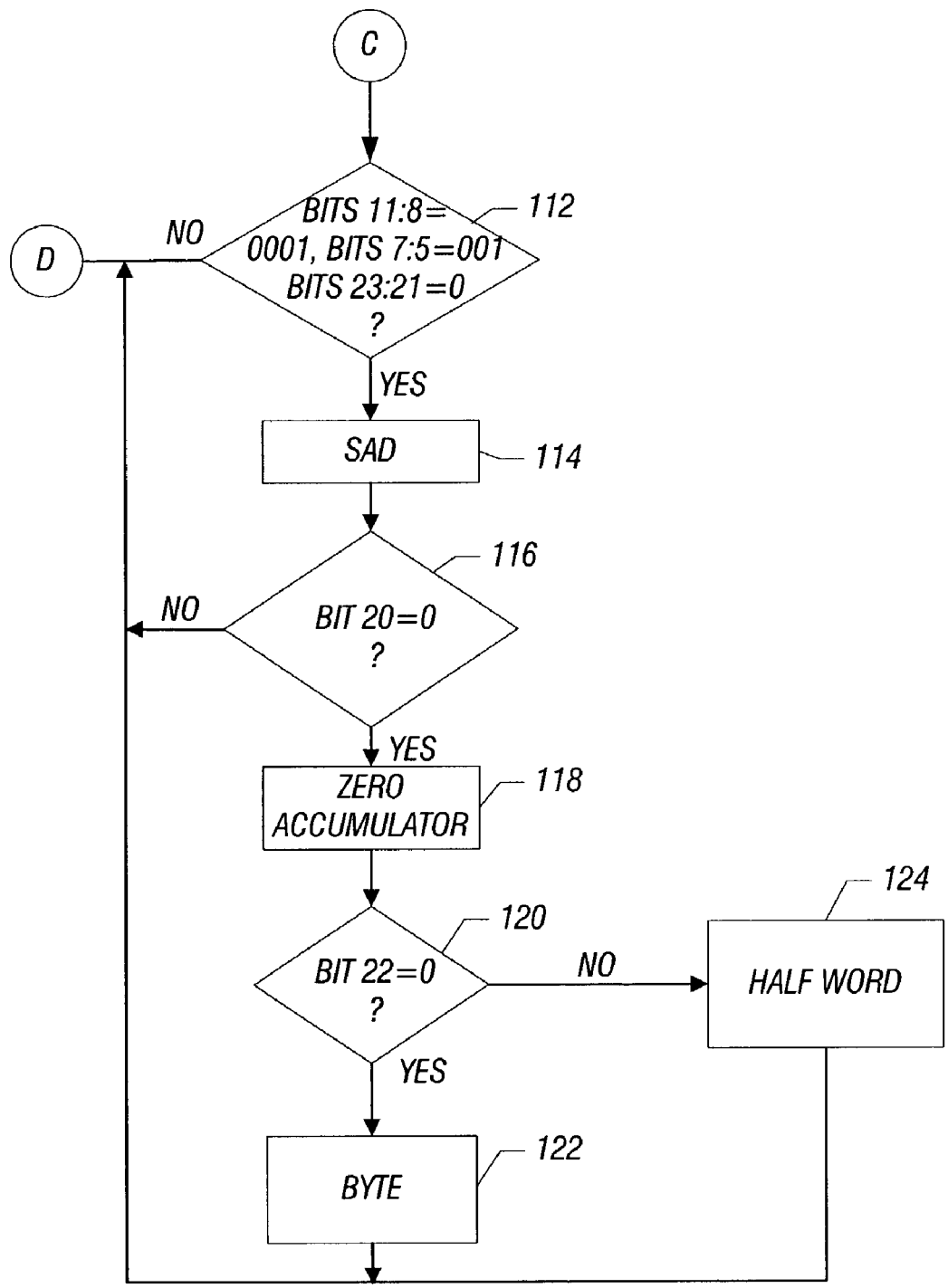
FIG. 8 is a flow chart for a sum of absolute differences operation in accordance with one embodiment of the present invention.

Referring to FIG. 8, a check at diamond 112 determines whether the bit pattern specifies a SAD operation, which is set in block 114. If so, a check at diamond 116 determines whether the bit 20 is zero, which requires that the accumulator be zeroed, as indicated in block 118. A check at diamond 120 determines whether the bit 22 is zero, which indicates a byte size calculation. Otherwise, a half word is set, as indicated in block 124.

The coprocessor can perform unpack operations unpacking source operands into a destination register. There are two modes, interleave unpack and extend unpack. There can be two source operands in the interleave mode and only a single source operand extending the SIMD fields. Source data can be a byte, half word, or word. The coprocessor can unpack and interleave two source operands with the SIMD field width remaining the same. It can unpack the lower or upper half of the source operand(s). It can also unpack a single source operand, doubling each SIMD width. It can zero extend the single source unpack values and can sign extend the single source unpack values. It can set saturation set on final result flags (N and Z) for each SIMD field. Conditional execution may be specified and may be implemented as shown in FIG. 4, for example.

The bits 8 through 11 are 0000. The bits 7 through 6 are 11 and bit five determines whether it is a high or low unpack. The bit positions 22 and 23 are used to determine the data size. The bits 22 and 23 are 00 for byte size, 01 for half word size, and 10 for word size. A bit 20 determines if the extend mode or interleave mode is selected. For interleave mode, the bit is one. The bit 21 determines whether to sign or zero extend and is set to sign if the bit is one. The value in bit 5 determines whether to unpack the lower or upper part of the source operands. For lower unpacking, the bit is one and for upper unpacking, the bit is zero.

Figure 9:
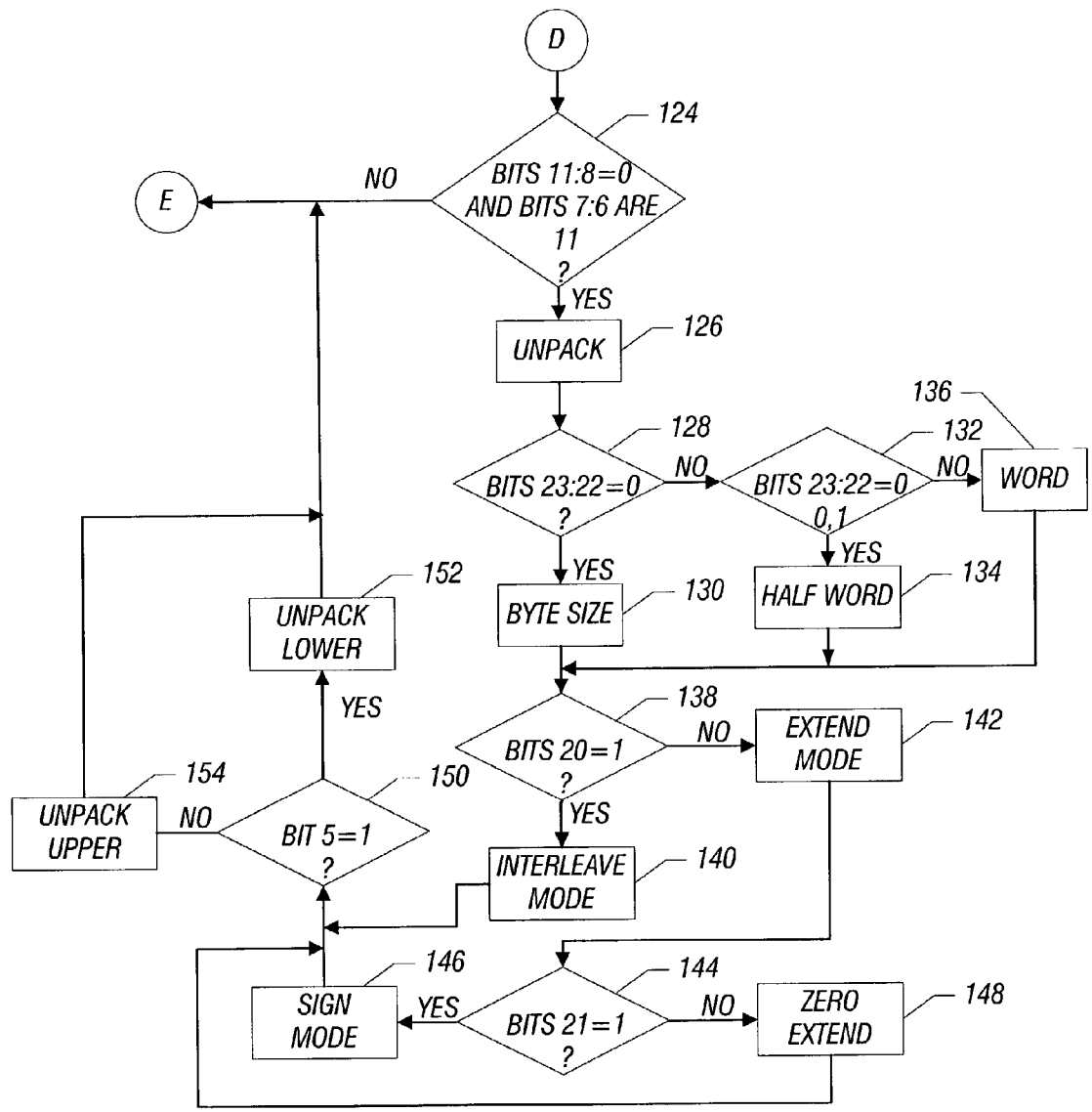
FIG. 9 is a flow chart for an unpack operation in accordance with one embodiment of the present invention.

Referring to FIG. 9, a check at diamond 124 determines whether or not an unpack operation is specified by the bit pattern. If so, a check at diamond 128 determines whether the bits 23 and 22 indicate a byte size, half word size, or a word size data. Next, a check at diamond 138 determines whether the bit 20 equals one, indicating an interleave mode, as indicated in block 140 or an extend mode if the byte 20 is not equal to one, as indicated in block 142. A check at diamond 144 determines whether or not the bit 21 is equal to one, indicating a sign mode or, otherwise, a zero extend, as indicated in block 148. A check at diamond 150 determines whether the bit 5 is equal to one, indicating an unpack lower mode, as indicated in block 152. Otherwise, an unpack upper mode is set, as indicated in block 154.

The extend high mode unpack operation unpacks 8 bit, 16 bit, or 32 bit data from the top half of the wRn source register and either zero or signed extends each field and places the result into the destination register wRn. An unsigned extend high is shown in FIG. 10A and a signed extend high is shown in FIG. 10B.

Figure 11:
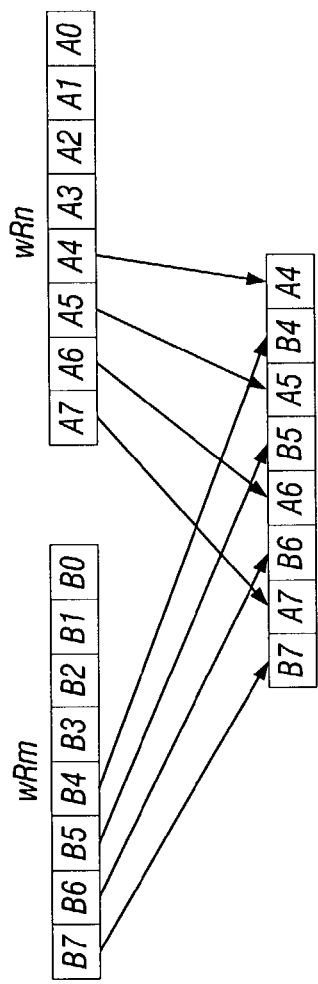
FIG. 11 is a depiction of still another operation in accordance with one embodiment of the present invention.

The instruction interleave high mode unpack unpacks either 8 bit, 16 bit, or 32 bit data from the top half of wRn, interleaves with the top half of wRm and places the result in the destination register wRd. The unpack interleave high mode instruction is shown in FIG. 11.

The extend low unpack instruction unpacks 8 bit, 16 bit, or 32 bit data from the lower half of wRn, which is a source register, and either zero or signed extends each field and places the result into the destination register wRd. An unsigned extend low is shown in FIG. 12A and a signed extend low is shown in FIG. 12B.

Figure 13:
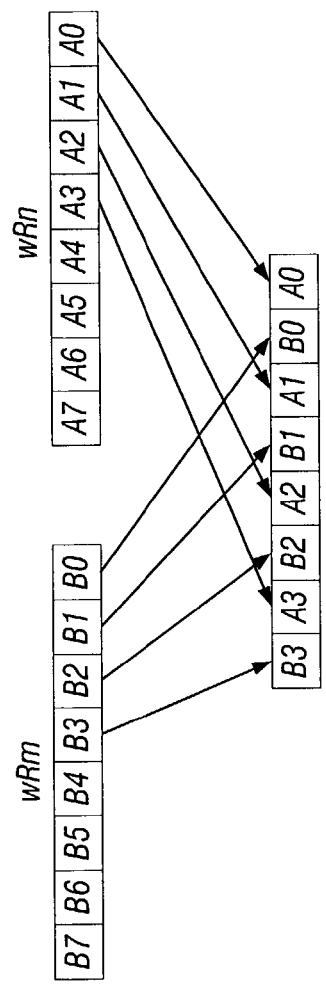
FIG. 13 is a depiction of another operation in accordance with one embodiment of the present invention.

Finally, an unpack interleave low unpacks either 8 bit, 16 bit, or 32 bit data from the lower half of wRn and the lower half of wRm and places the result in the destination register wRd. An unpack interleave low instruction is shown in FIG. 13.

The pack operation packs data from two source registers into a single destination register. The source data can be a half word, word, or double word. It can use signed saturation and unsigned saturation during packing. The bits 8 through 11 are 0000 and the bits 5 through 7 are 100. The values in bit positions 22 and 23 determine the data size. A half word data size is set for bits 01, the word data size is set for bits 10, and a double word data size is set for bits 11. The values in positions 20 and 21 determine the saturation type. Unsigned saturation is specified for bits 01 and signed saturation is set for bits 11. The pack instruction packs data from wRn and wRm into wRd, with wRm being packed in the upper half and wRn being packed in the lower half for vectors of 16, 32, or 64 bit data. The results are saturated and placed in a destination register wRd. Packing can be performed with signed or unsigned saturation. For a half word:

wRd[byte 7 ]=saturate(wRm[half 3 ], {US,SS}, 8)
wRd[byte 6 ]=saturate(wRm[half 2 ], {US,SS}, 8)
wRd[byte 5 ]=saturate(wRm[half 1 ], {US,SS}, 8)
wRd[byte 4 ]=saturate(wRm[half 0 ], {US,SS}, 8)
wrd[byte 3 ]=saturate(wRn[half 3 ], {US,SS}, 8)
wrd[byte 2 ]=saturate(wRn[half 2 ], {US,SS}, 8)
wRd[byte 1 ]=saturate(wRn[half 1 ], {US,SS}, 8)
wRd[byte 0 ]=saturate(wRn[half 0 ], {US,SS}, 8)
For a full word:
wRd[half 3 ]=saturate(wRm[word 1], {US,SS}, 16)
wRd[half 2 ]=saturate(wRm[word 0], {US,SS}, 16)
wRd[half 1 ]=saturate(wRn[word 1], {US,SS}, 16)
wRd[half 0 ]=saturate(wRn[word 0], {US,SS}, 16)
For a double word:
wRd[word 1]=saturate(wRn, {US,SS}, 32)
wrd[word 0]=saturate(wRn, {US,SS}, 32)

Figure 14:
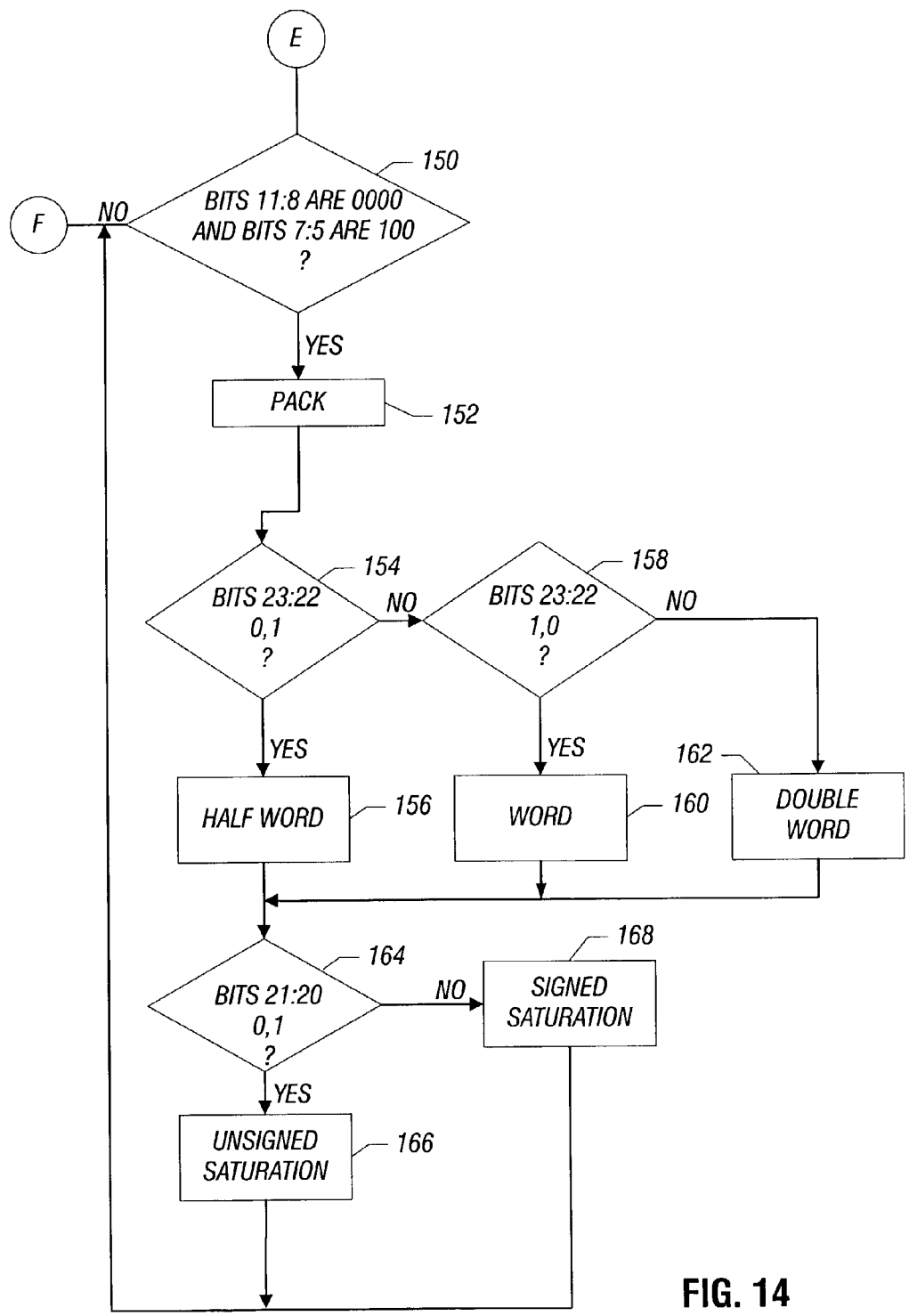
FIG. 14 is a flow chart for a pack operation in accordance with one embodiment of the present invention.

Referring to FIG. 14, a check at diamond 150 determines whether the bit pattern indicates that a pack operation is specified, as indicated in diamond 150 and block 152. If so, checks at diamonds 154 and 158 determine whether a half word, word, or double word is specified. A check at diamond 164 determines whether the bits 21 and 20 indicate unsigned saturation (block 166) or signed saturation (block 168). Conditional execution may be specified and implemented as shown in FIG. 4, for example.

The average two instruction performs a 2 value average of wRn and wRm on unsigned vectors of 8 or 16 bit data with optional rounding of +1 and places the result in destination register wRd. Source data can be a byte or half word and can have an optional round mode. The bits 8 through 11 are 0000, the bit 23 is 1, and the bit 21 is 0 and bits 7 through 5 are 000. The value in bit position 22 determines the data size. A bit 22 equal to 0 indicates a byte data size and a 1 indicates a half word data size. The bit 20 determines whether to round or not to round. A 1 bit determines rounding and a 0 bit is for no rounding. Conditional execution may be specified and implemented as shown in FIG. 4, for example.

Figure 15:
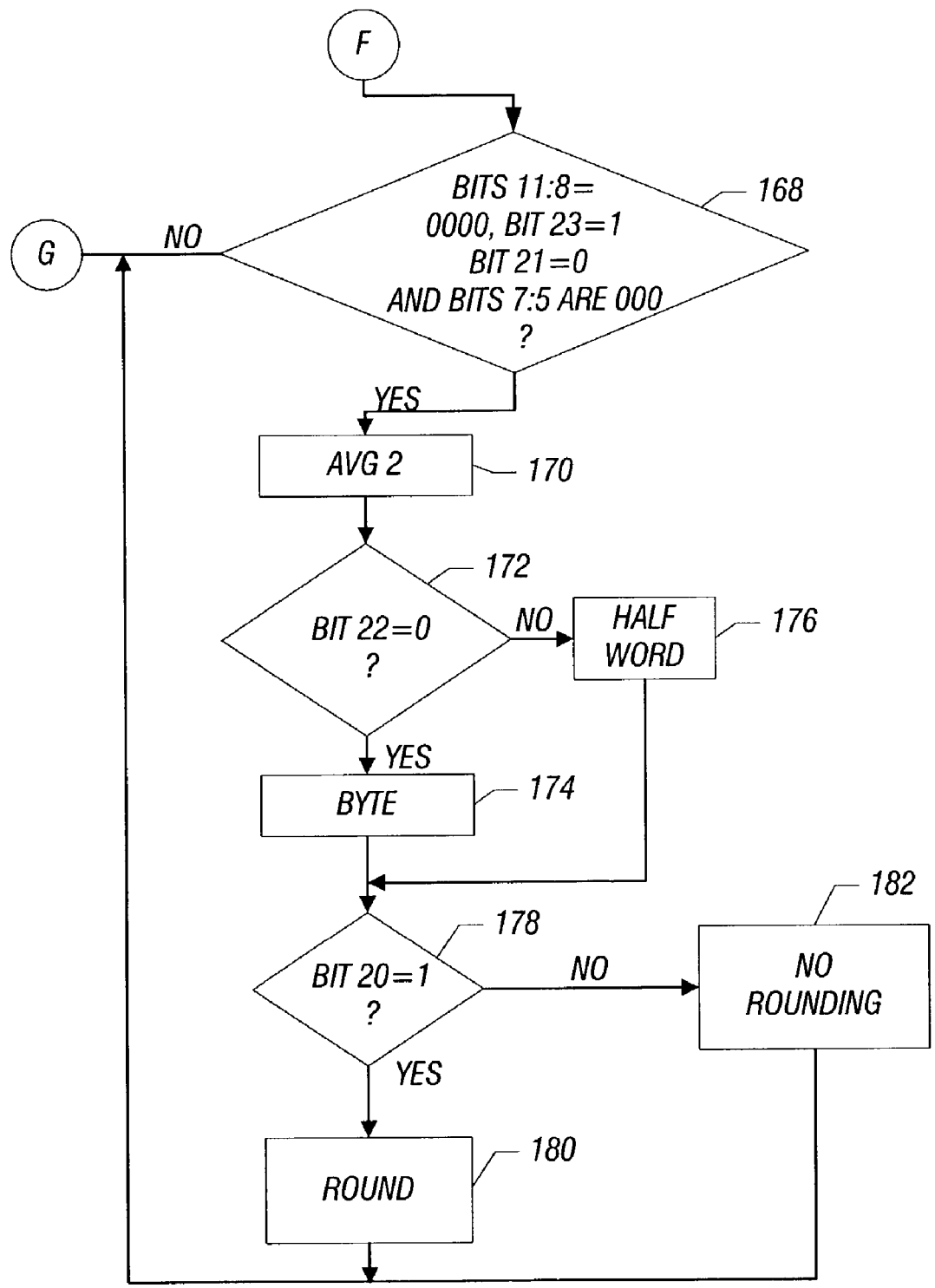
FIG. 15 is a flow chart for an average two operation in accordance with one embodiment of the present invention.

Referring to FIG. 15, at diamond 168 a determination is made as to whether an average two operation is specified, which is set in block 170 if the bit pattern so indicates. A check at diamond 172 determines whether the data size is a half word (block 176) or byte (block 174). A check at diamond 178 determines whether rounding (block 180) or no rounding (block 182) is specified.

If a byte size SIMD occurs then:
wRd[byte 7 ]=(wRn[byte 7 ]+wRm[byte 7 ]+Round)/2
wRd[byte 6 ]=(wRn[byte 6 ]+wRm[byte 6 ]+Round)/2
wRd[byte 5 ]=(wRn[byte 5 ]+wRm[byte 5 ]+Round)/2
wRd[byte 4 ]=(wRn[byte 4 ]+wRm[byte 4 ]+Round)/2
wRd[byte 3 ]=(wRn[byte 3 ]+wRm[byte 3 ]+Round)/2
wRd[byte 2 ]=(wRn[byte 2 ]+wRm[byte 2 ]+Round)/2
wRd[byte 1 ]=(wRn[byte 1 ]+wRm[byte 1 ]+Round)/2
wRd[byte 0 ]=(wRn[byte 0 ]+wRm[byte 0 ]+Round)/2
If a half word SIMD occurs then:
wRd[half 3 ]=(wRn[half 3 ]+wRm[half 3 ]+Round)/2
wRd[half 2 ]=(wRn[half 2 ]+wRm[half 2 ]+Round)/2
wRd[half 1 ]=(wRn[half 1 ]+wRm[half 1 ]+Round)/2
wRd[half 0 ]=(wRn[half 0 ]+wRm[half 0 ]+Round)/2

A shuffle operation allows the selection of 16 bit data values in a destination register wRd from 16 bit fields in source registers specified by an 8 bit intermediate value. It allows any half word for the source to be placed in any half word in the destination. The bits 8 through 11 are 0001 and the bits 5 through 7 are 111. The value chosen for half word zero is determined by the value of bits one and zero. The value chosen for half word one is determined by the value of bits 2 and 3. The value chosen for half word 2 is determined by the value of bits 20 and 21. The value chosen for half word 3 is determined by the value of bits 23 and 22. Conditional execution may be specified and implemented as shown in FIG. 4, for example.

Figure 16:
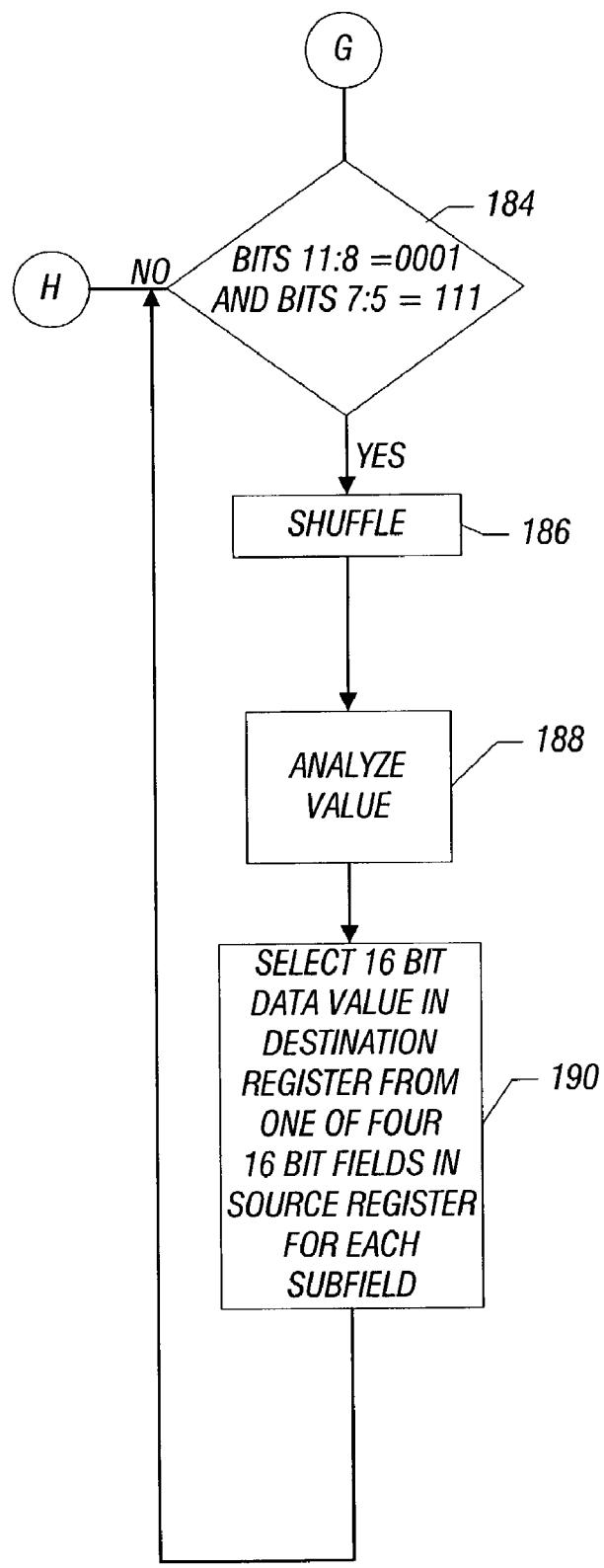
FIG. 16 is a flow chart for a shuffle operation in accordance with one embodiment of the present invention.

Referring to FIG. 16, a check at diamond 184 determines whether or not a shuffle operation is specified which is set at block 186 if the bit pattern so indicates. Block 188 determines which bits in a source register will be shuffled into which fields in the destination register. At block 190 a 16 bit value in the destination register is selected from one of four sixteen bit values in fields in the source register. This is repeated for each four SIMD fields. Conditional execution may be specified and implemented as shown in FIG. 4, for example.

The accumulate operation accumulates adds all fields of an SIMD word. It can operate on byte, half word, or word data formats. Bits 8 through 11 are 0001. Bits 5 through 7 are 110, and the bits 21 and 20 are 00. The bits 23 and 22 determine the source data type with a byte data source for the bits 00, a half word for the bits 01, and a word for the bits 10.

Figure 17:
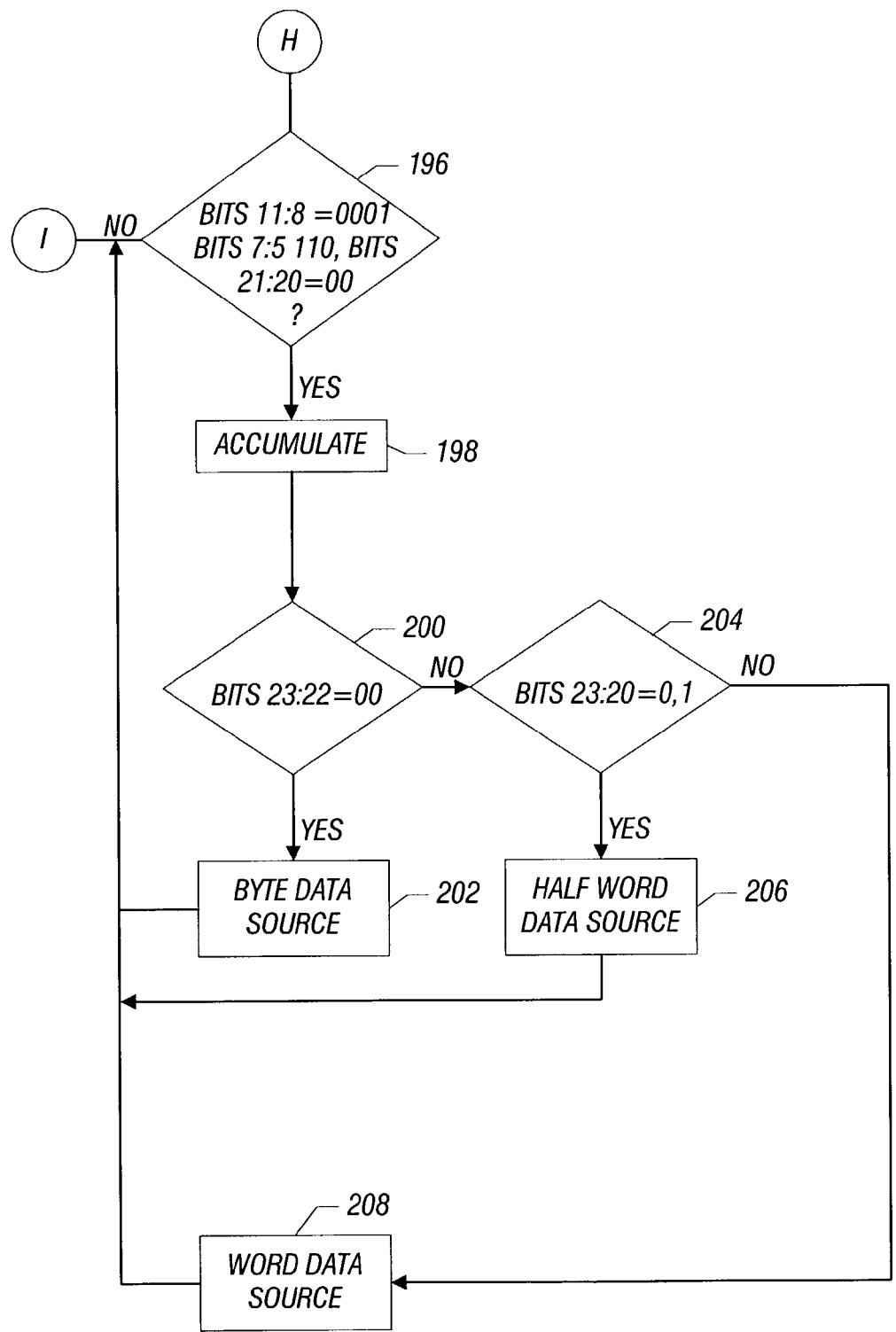
FIG. 17 is a flow chart for an accumulate operation in accordance with one embodiment of the present invention.

Referring to FIG. 17, at diamond 196 a determination indicates whether or not an accumulate (block 198) operation has been specified. If so, the bits 23 and 20 are analyzed to determine whether a byte data source is provided for (block 202), a half word data source (block 206), or a word data source (block 208).

The instruction accumulate performs an unsigned accumulate across a source register wRn field and writes the result to a destination register wRd. If a byte SIMD is specified, then:
wRd=wRn[63:56]+wRn[55:48]+wRn[47:40]+wRn[39:32]wRn[31:24]+wRn[23:16]+wRn[15:8]+wRn[7:0]
If a half word SIMD is specified then:
wRd=wRn[63:48]+wRn[47:32]+wRn[31:16]+wRn[15:0]
If a word is specified then:
wRd=wRn[63:32]+wRn[31:0]

The maximum and minimum operations place the biggest or smallest value from each source field in the corresponding destination field. The source data can be a byte, a half word, or a word. It can compare using signed or unsigned operands. The bits 11 through 8 must be 0001. The bits 7 through 5 should be 011. The values in bit positions 23, 22 determine the data size. Namely, for 00, a byte data size is determined, for 01 a half word data size is determined, and for 10 a word data size is determined. The bit 21 determines whether to do a signed or unsigned comparison. The bit 20 determines whether to select the maximum or minimum value. A maximum is selected for a bit 20 having a zero value. Conditional execution may be specified and may be implemented as indicated in FIG. 4, for example.

Figure 18:
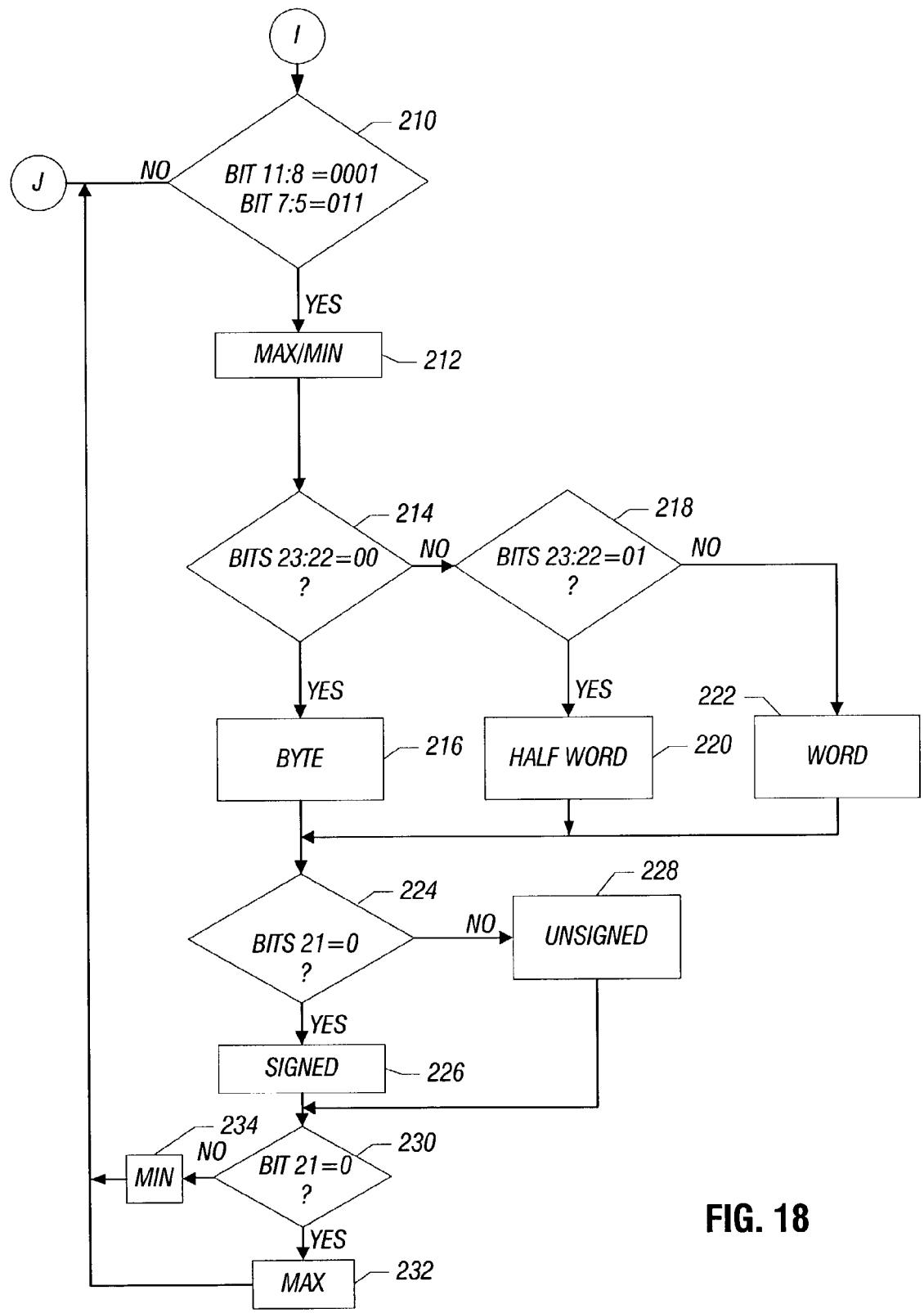
FIG. 18 is a flow chart for a maximum/minimum operation in accordance with one embodiment of the present invention.

Referring to FIG. 18, a check at diamond 210 indicates whether a maximum or minimum operation is specified, which is indicated in block 212. The bits 23 through 20 are analyzed in diamonds 214 and 218 to determine whether a byte (block 216), half word (block 220), or word (block 222) data size is specified. A check at diamond 224 determines whether signed (block 226) or unsigned (block 228) comparisons are appropriate. Finally, a check at diamond 230 determines whether or not the operation is a maximum (block 232) or minimum (block 234).

The maximum operation performs vector maximum selection if elements from wRn and wRm for vectors of 8, 16, and 32 bit data and places the maximum fields from the destination register wRd. If an 8 bit or byte SIMD is specified, then:

wRd[byte 7 ]=(wRn[byte 7 ]>wRm[byte 7 ])?wRn[byte 7 ]:wRm[byte 7 ]
wRd[byte 6 ]=(wRn[byte 6 ]>wRm[byte 6 ])?wRn[byte 6 ]:wRm[byte 6 ]
wRd[byte 5 ]=(wRn[byte 5 ]>wRm[byte 5 ])?wRn[byte 5 ]:wRm[byte 5 ]
wRd[byte 4 ]=(wRn[byte 4 ]>wRm[byte 4 ])?wRn[byte 4 ]:wRm[byte 4 ]
wRd[byte 3 ]=(wRn[byte 3 ]>wRm[byte 3 ])?wRn[byte 3 ]:wRm[byte 3 ]
wRd[byte 2 ]=(wRn[byte 2 ]>wRm[byte 2 ])?wRn[byte 2 ]:wRm[byte 2 ]
wRd[byte 1 ]=(wRn[byte 1 ]>wRm[byte 1 ])?wRn[byte 1 ]:wRm[byte 1 ]
wRd[byte 0 ]=(wRn[byte 0 ]>wRm[byte 0 ])?wRn[byte 0 ]:wRm[byte 0 ]

If a half word SIMD is specified then:
wRd[half 3 ]=(wRn[half 3 ]>wRm[half 3 ])?wRn[half 3 ]:wRm[half 3 ]
wRd[half 2 ]=(wRn[half 2 ]>wRm[half 2 ])?wRn[half 2 ]:wRm[half 2 ]
wRd[half 1 ]=(wRn[half 1 ]>wRm[half 1 ])?wRn[half 1 ]:wRm[half 1 ]
wRd[half 0 ]=(wRn[half 0 ]>wRm[half 0 ])?wRn[half 0 ]:wRm[half 0 ]

If a word is specified then:
wRd[word 1]=(wRn[word 1]>wRm[word 1])?wRn[word 1]:wRm[word 1]
wRd[word 0]=(wRn[word 0]>wRm[word 0])?wRn[word 0]:wRm[word 0]

A minimum operation performs vector minimum selection of elements from wRn and wRm for vectors of 8, 16, or 32 bit data and places the minimum fields in the destination register wRd. If a byte SIMD is specified then
wRd[byte 7 ]=(wRn[byte 7 ]<wRm[byte 7 ])?wRn[byte 7 ]:wRm[byte 7 ]
wRd[byte 6 ]=(wRn[byte 6 ]<wRm[byte 6 ])?wRn[byte 6 ]:wRm[byte 6 ]
wRd[byte 5 ]=(wRn[byte 5 ]<wRm[byte 5 ])?wRn[byte 5 ]:wRm[byte 5 ]
wRd[byte 4 ]=(wRn[byte 4 ]<wRm[byte 4 ])?wRn[byte 4 ]:wRm[byte 4 ]
wRd[byte 3 ]=(wRn(byte 31<wRm[byte 3 ])?wRn[byte 3 ]:wRm[byte 3 ]
wRd[byte 3 ]=(wRn[byte 2 ]<wRm[byte 2 ])?wRn[byte 2 ]:wRm[byte 2 ]
wRd[byte 1 ]=(wRn[byte 1 ]<wRm[byte 1 ])?wRn[byte 1 ]:wRm[byte 1 ]
wRd[byte 0 ]=(wRn[byte 0 ]<wRm[byte 0 ])?wRn[byte 0 ]:wRm[byte 0 ]

If a half word SIMD is specified then:
wRd[half 3 ]=(wRn[half 3 ]<wRm[half 3 ])?wRn[half 3 ]:wRm[half 3 ]
wrd[half 2 ]=(wRn[half 2 ]<wRm[half 2 ])?wRn[half 2 ]:wRm[half 2 ]
wRd[half 1 ]=(wRn[half 1 ]<wRm[half 1 ])?wRn[half 2 ]:wRm[half 1 ]
wRd[half 0 ]=(wRn[half 0 ]<wRm[half 0 ])?wRn[half 0 ]:wRm[half 0 ]

If a word is specified then:
wRd[word 1]=(wRn[word 1]<wRm[word 1])?wRn[word 1]:wRm[word 1]
wRd[word 0]=(wRn[word 0]<wRm[word 0])?wRn[word 0]:wRm[word 0]

The compare operation compares the source operands and places all ones in the destination field if successful. It places all zeros in the destination field if the comparison fails. It can compare "if equal" and can compare "if greater than" with unsigned operands or with signed operations. The bits 11 through 8 are 0000 and the bits 7 through 5 are 011. It uses a value in the bit positions 22 and 23 to determine the data size. For a byte data size, the values are 00, for half word data size the value is 01, and for the word data size the value is 10. It uses a bit 20 to determine whether to select the "if equal" or "if greater than" comparison. It uses a bit 21 to determine whether to do a signed or unsigned "if greater than" comparison. Conditional execution may be specified and implemented as indicated in FIG. 4, for example.

The compare "equal" performs vector equality comparison of wRn and wRm for vectors of 8, 16, or 32 bit data, setting the corresponding data elements of wRd to all ones when the source operands are equal and otherwise setting the data elements of wRd to all zeros. If a byte SIMD is specified then:
wRd[byte 7 ]=(wRn[byte 7 ]==wRm[byte 7 ])?0xFF:0x00
wRd[byte 6 ]=(wRn[byte 6 ]==wRm[byte 6 ])?0xFF:0x00
wRd[byte 5 ]=(wRn[byte 5 ]==wRm[byte 5 ])?0xFF:0x00
wRd[byte 4 ]=(wRn[byte 4 ]==wRm[byte 4 ])?0xFF:0x00
wRd[byte 3 ]=(wRn[byte 3 ]==wRm[byte 3 ])?0xFF:0x00
wRd[byte 2 ]=(wRn[byte 2 ]==wRm[byte 2 ])?0xFF:0x00
wRd[byte 1 ]=(wRn[byte 1 ]==wRm[byte 1 ])?0xFF:0x00
wRd[byte 0 ]=(wRn[byte 0 ]==wRm[byte 0 ])?0xFF:0x00

If a half word is specified then:
wRd[half 3 ]=(wRn[half 3 ]==wRm[half 3 ])?0xFFFF:0x0000
wRd[half 2 ]=(wRn[half 2 ]==wRm[half 2 ])?0xFFFF:0x0000
wRd[half 1 ]=(wRn[half 1 ]==wRm[half 1 ])?0xFFFF:0x0000
wRd[half 0 ]=(wRn[half 0 ]==wRm[half 0 ])?0xFFFF:0x0000

If a word is specified then:
wRd[word 1]=(wRn[word 1]==wRm[word 1])?0xFFFFFFFF:0x00000000
wRd[word 0]=(wRn[word 0]==wRm[word 0])?0xFFFFFFFF:0x00000000

The compare "if greater than" operation performs vector magnitude comparison of wRn and wRm for vectors of 8, 16, and 32 bit data, setting the corresponding data elements of wRd to all ones when corresponding fields of wRn are greater than wRm. Otherwise, it sets wRd to all zeros. The operation can be performed on either signed or unsigned data. The signed comparison is specified when signed values are used. If a byte size SIMD is specified then:
wRd[byte 7 ]=(wRn[byte 7 ]>wRm[byte 7 ])?0xFF:0x00
wRd[byte 6 ]=(wRn[byte 6 ]>wRm[byte 6 ])?0xFF:0x00
wRd[byte 5 ]=(wRn[byte 5 ]>wRm[byte 5 ])?0xFF:0x00
wRd[byte 4 ]=(wRn[byte 4 ]>wRm[byte 4 ])?0xFF:0x00
wRd[byte 3 ]=(wRn[byte 3 ]>wRm[byte 3 ])?0xFF:0x00
wRd[byte 2 ]=(wRn[byte 2 ]>wRm[byte 2 ])?0xFF:0x00
wRd[byte 1 ]=(wRn[byte 1 ]>wRm[byte 1 ])?0xFF:0x00
wRd[byte 0 ]=(wRn[byte 0 ]>wRm[byte 0 ])?0xFF:0x00

If a half word is specified then:
wRd[half 3 ]=(wRn[half 3 ]>wRm[half 3 ])?0xFFFF:0x0000
wRd[half 2 ]=(wRn[half 2 ]>wRm[half 2 ])?0xFFFF:0x0000
wRd[half 1 ]=(wRn[half 1 ]>wRm[half 1 ])?0xFFFF:0x0000
wRd[half 0 ]=(wRn[half 0 ]>wRm[half 0 ])?0xFFFF:0x0000

If a word is specified then:
 wRd[word 1]=(wRn[word 1]>wRm[word 1])?0xFFFFFFFF:0x00000000
 wRd[word 0]=(wRn[word 0]>wRm[word 0])?0xFFFFFFFF:0x00000000

Figure 19:
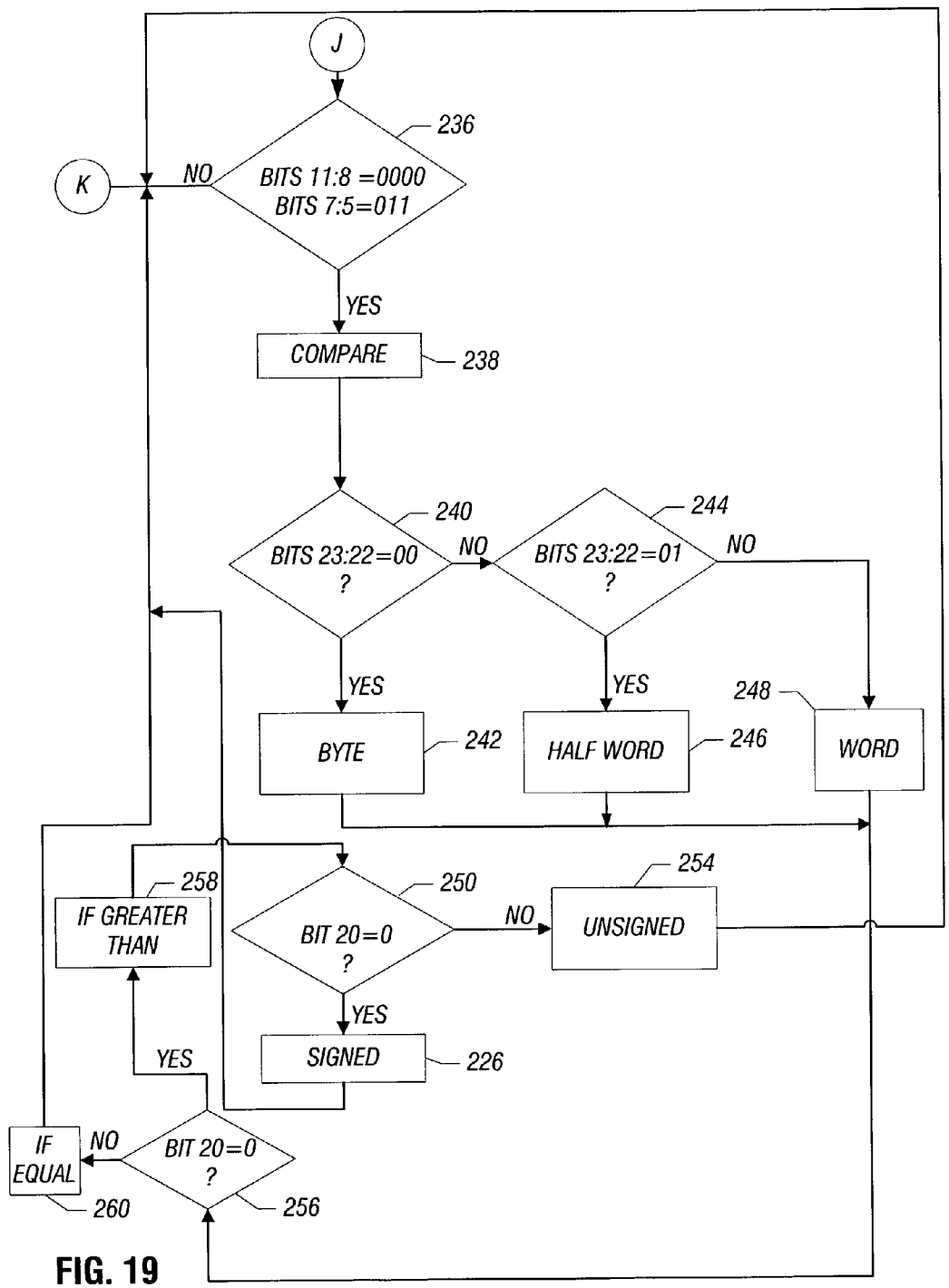
FIG. 19 is a flow chart for a compare operation in accordance with one embodiment of the present invention.

Referring to FIG. 19, a check at diamond 236 determines whether a compare operation is specified which is set, if appropriate, at block 238. At diamonds 240 and 244, a determination is made as to whether a byte (block 242), half word (block 246), or word (block 248) data size is specified. A check at diamond 256 determines whether the operation is an "if greater than" operation (block 258) or an "if equal" operation is specified (block 260). At diamond 250, a check determines whether or not signed or unsigned "if greater than" calculations are appropriate.

The broadcast operation broadcasts a value from a source register (Rn) in the main processor into all fields of a SIMD destination register (wRd) in the coprocessor. For example, a byte (8 bits) data element may be transferred into all of eight destination data elements in a destination register wRd having a 64 bit capacity. As another example, a word (32 bits) may be placed in both positions in a destination register. As still another example, a half word (16 bits) may be transferred into all four data elements in a destination register. Bits 11 through 8 are 0000, the bits 23 through 21 are 010 and the bit 5 is zero. The value in bit positions 7 and 6 determines the data size of the destination register. For a byte, bits 7 and 6 are 00, for a half word the bits 7 and 6 are 01, and for a word the bits 7 and 6 are 10. As for the byte size SIMD, the value is placed into every location of wRd. For half word size the value is placed four times in wRd. For a word size the value is placed two times in wRd.

Conditional execution may be specified in bits 28 through 31 and implemented as indicated in FIG. 4, for example. The bits 24 through 27 are 1110, the bit 20 is 0, the bits 16 through 19 are for wRd, the bits 12 through 15 are for Rn, the bit 4 is one, and the bits 0 through 3 are 0000.

Figure 20:
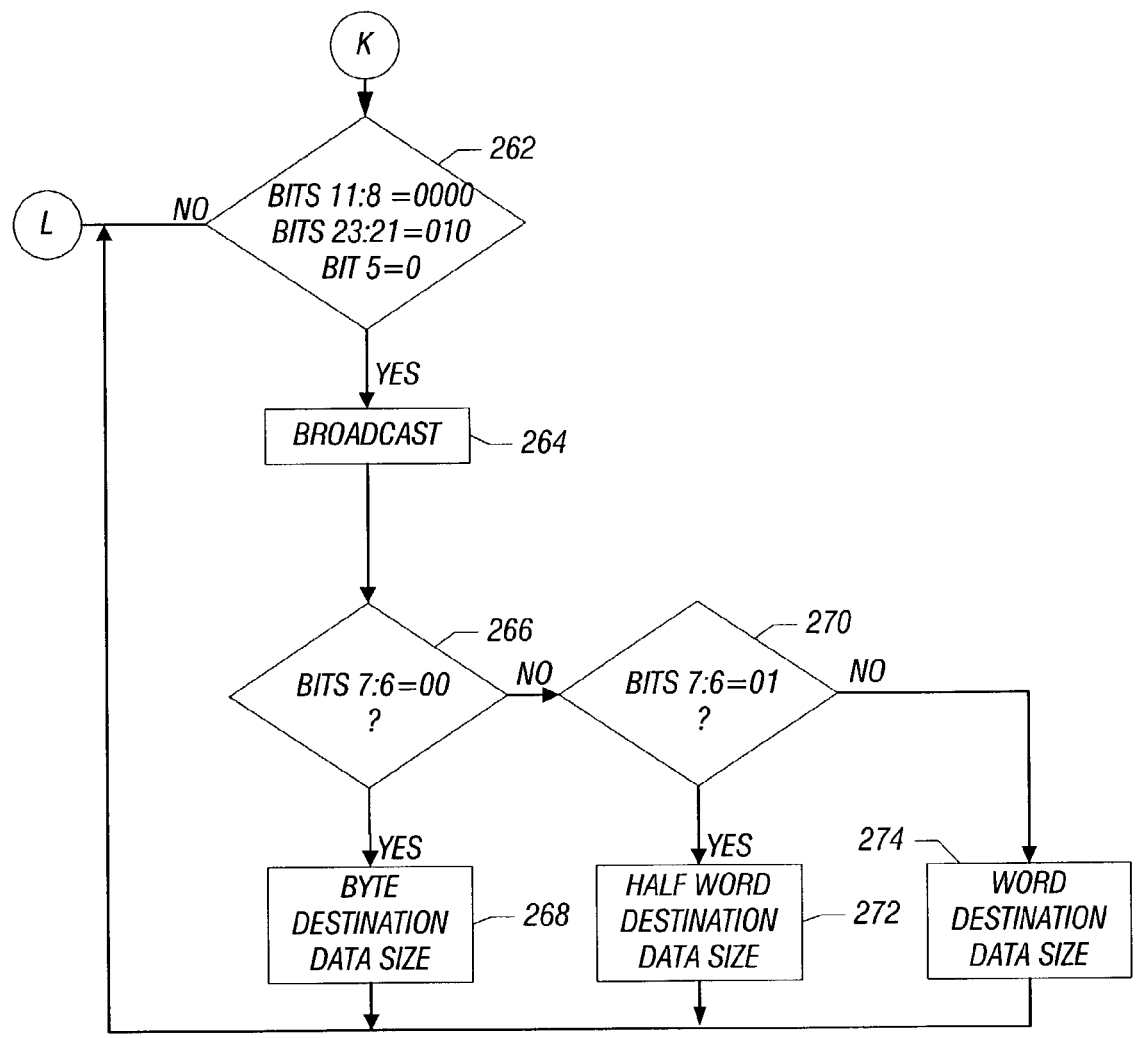
FIG. 20 is a flow chart for a broadcast operation in accordance with one embodiment of the present invention.

Referring to FIG. 20, at diamond 262, a determination is made as to whether a broadcast (block 264) is specified. The diamonds 266 and 270 analyze the bits 6 and 7 to determine whether or not the destination data size is a byte (block 268), half word (block 272), or word (block 274).

The shift operation performs vector logical shift-left wRn by wRm for vectors of 16, 32, or 64 bit data and places the result in wRd. It uses bits zero to three to encode the register containing the shift value. The bit 8 is used to determine whether the shift value comes from a register in the main or in the CGR 44 (wCGRm). A shift instruction with the G-qualifier specified uses the shift value stored in the general purpose register specified in the wRm field. The bits 23 and 22 determine the size of the operand. The value 010 in bit positions 7 to 5 determines the shift operation. The value 01 in bit positions 21 and 22 indicates logical left shift. The value 00 in bit positions 21 and 22 indicates arithmetic right shift. The value 10 in bit positions 21 and 20 indicates logical right shift and the value 11 in bit positions 21 and 20 indicates a rotate. Conditional execution may be specified and may be implemented as indicated in FIG. 4, for example.

For a logical shift left, if a half word is specified then:
 wRd[half 3 ]=wRn[half 3 ]<<((G Specified)?wCGRm[7:0]:wRm[7:0]
 wRd[half 2 ]=wRn[half 2 ]<<((G Specified)?wCGRm[7:0]:wRm[7:0]
 wRd[half 1 ]=wRn[half 1 ]<<((G Specified)?wCGRm[7:0]:wRm[7:0]
 wRd[half 0 ]=wRn[half 0 ]<<((G Specified)?wCGRm[7:0]:wRm[7:0]

If a 32 bit word is specified then:
 wRd[word 1]=wRn[word 1]<<((G Specified)?wCGRm[7:0]:wRm[7:0]
 wRd[word 0]=wRn[word 0]<<((G Specified)?wCGRm[7:0]:wRm[7:0]

If a double word is specified then:
 wRd=wRn<<((G Specified)?wCGRm[7:0]:wRm[7:0]

For a shift right operation, a vector arithmetic shift right of wRn by wRm for vectors of 16, 32, or 64 bit data sizes and places the result in wRd. For a half data size then:
 wRd[half 3 ]=wRn[half 3 ]>>((G Specified)?wCGRm[7:0]:wRm[7:0]
 wRd[half 2 ]=wRn[half 2 ]>>((G Specified)?wCGRm[7:0]:wRm[7:0]
 wRd[half 1 ]=wRn[half 1 ]>>((G Specified)?wCGRm[7:0]:wRm[7:0]
 wRd[half 0 ]=wRn[half 0 ]>>((G Specified)?wCGRm[7:0]:wRm[7:0]

Otherwise for a word data size then:
 wRd[word 1]=wRn[word 1]>>((G Specified)?wCGRm[7:0]:wRm[7:0]
 wRd[word 0]=wRn[word 0]>>((G Specified)?wCGRm[7:0]:wRm[7:0]

If a double word is specified then:
 wRd=wRn>>((G Specified)?wCGRm[7:0]:wRm[7:0]

For a vector logical shift right of wRn by wRm for vectors of 16, 32, or 64 bit data, the result is placed in wRd. If a half word is specified then:
 wRd[half 3 ]=wRn[half 3 ]>>((G Specified)?wCGRm[7:0]:wRm[7:0]
 wRd[half 2 ]=wRn[half 2 ]>>((G Specified)?wCGRm[7:0]:wRm[7:0]
 wRd[half 1 ]=wRn[half 1 ]>>((G Specified)?wCGRm[7:0]:wRm[7:0]
 wRd[half 0 ]=wRn[half 0 ]>>((G Specified)?wCGRm[7:0]:wRm[7:0]

If a word is specified then:
 wRd[word 1]=wRn[word 1]>>((G Specified)?wCGRm[7:0]:wRm[7:0]
 wRd[word 0]=wRn[word 0]>>((G Specified)?wCGRm[7:0]:wRm[7:0]

If a double word is specified then:
 wRd=wRn>>((G Specified)?wCGRm[7:0]:wRm[7:0]

For a vector logical rotate right of wRn by wRm, for vectors of 16, 32, or 64 bit data, the result is placed in a destination register wRd.

If a half word is specified then:
 wRd[half 3 ]=wRn[half 3 ]rotate_by((G Specified)?wCGRm[7:0]:wRm[7:0]
 wRd[half 2 ]=wRn[half 2 ]rotate_by((G Specified)?wCGRm[7:0]:wRm[7:0]
 wRd[half 1 ]=wRn[half 1 ]rotate_by((G Specified)?wCGRm[7:0]:wRm[7:0]
 wRd[half 0 ]=wRn[half 0 ]rotate_by((G Specified)?wCGRm[7:0]:wRm[7:0]

If a word is specified then:
 wRd[word 1]=wRn[word 1]rotate_by((G Specified)?wCGRm[7:0]:wRm[7:0]
 wRd[word 0]=wRn[word 0]rotate_by((G Specified)?wCGRm[7:0]:wRm[7:0]

If a double word is specified then:
 wRd=wRn rotate_by((G Specified)?wCGRm[7:0]:wRm[7:0]

Figure 21:
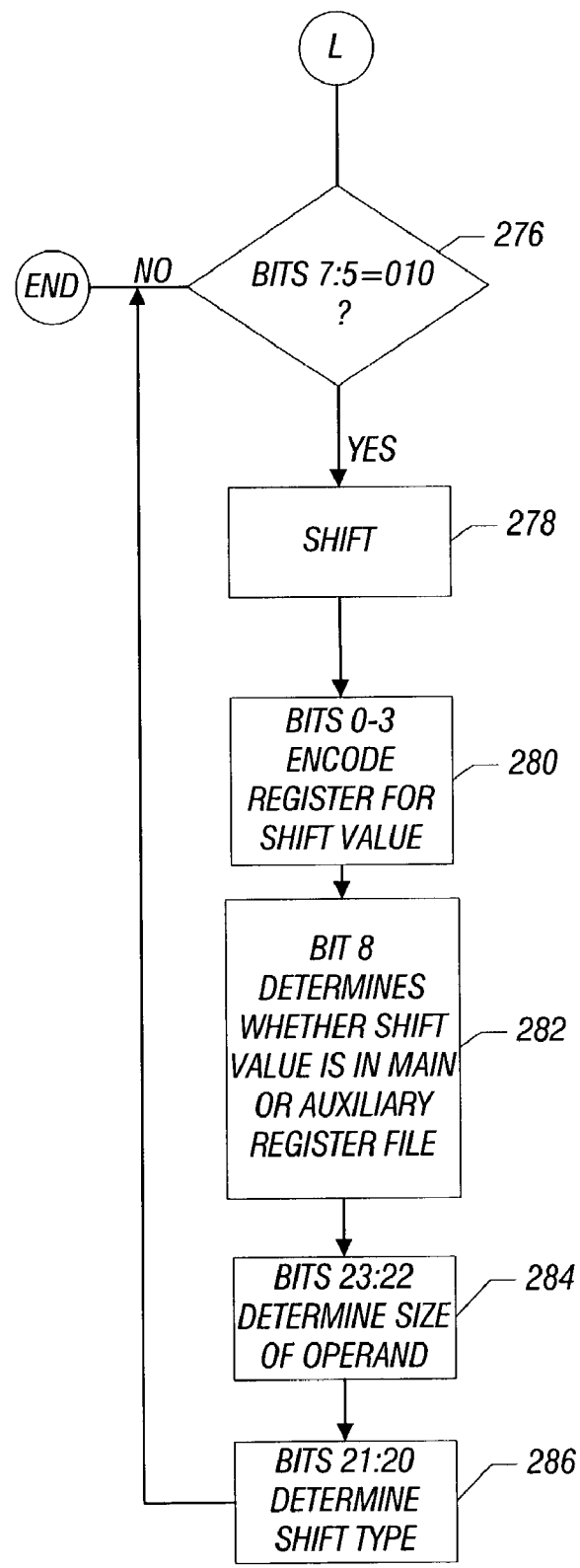
FIG. 21 is a flow chart for a shift operation in accordance with one embodiment of present invention.

Referring to FIG. 21, a shift operation (block 278) is determined in diamond 276. The bits 0 through 3 are analyzed in block 280 to encode the register for the shift value. At block 282 the bit 8 is analyzed to determine whether the shift value is in the main or auxiliary register file. At block 284, the bits 23 and 22 determine the size of the operand. At block 286, the bits 21 and 20 determine the shift type.

In summary, the instructions discussed herein use the following encoding for the indicated sets of bits (7–5, 23–20, 11–8):

| Instruction | 7–5 | 23–20 | 11–8 |
|---|---|---|---|
| OR | 000 | 0000 | 0000 |
| XOR | 000 | 0001 | 0000 |
| AND | 000 | 0010 | 0000 |
| ANDN | 000 | 0011 | 0000 |
| AVG2 | 000 | 1h0r | 0000 |
| Align immediate | 001 | 0vvv | 0000 |
| Align register | 001 | 10vv | 0000 |
| Shift right arithmetic | 010 | ww00 | 000g |
| Shift logical left | 010 | ww01 | 000g |
| Shift logical right | 010 | ww10 | 000g |
| Rotate | 010 | ww11 | 000g |
| Compare equal | 011 | ww00 | 0000 |
| Compare if greater than | 011 | wws1 | 0000 |
| Pack | 100 | wwss | 0000 |
| Unpack extend high | 110 | wws0 | 0000 |
| Unpack interleave high | 110 | ww01 | 0000 |
| Unpack extend low | 111 | wws0 | 0000 |
| Unpack interleave low | 111 | ww01 | 0000 |
| SAD | 001 | 0h0z | 0001 |
| Max | 011 | wws0 | 0001 |
| Min | 011 | wws1 | 0001 |
| Add | 100 | wwss | 0001 |
| Subtract | 101 | wwss | 0001 |
| Accumulate | 110 | ww00 | 0001 |
| Shuffle | 111 | ddcc | 0001 |
| Broadcast | ww0 | 010 | 0000 |

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
performing data processing using a main processor in response to a stream of data processing instructions, said data processing instructions including at least one coprocessor instruction;
providing a source register in said main processor and a destination register in said coprocessor, said registers including data elements; and
providing a coprocessor instruction that includes an opcode specifying a data processing operation to be performed by the coprocessor and a coprocessor identification field for identifying a target coprocessor for the coprocessor instruction, said instruction to broadcast a data element from said source register to said destination register.

2. The method of claim 1 including providing an instruction to broadcast a data element to all elements of said destination register.

3. The method of claim 1 including specifying the size of the data element to be broadcast.

4. The method of claim 3 including selectively specifying one of eight, sixteen, or thirty-two bit data elements to be broadcast.

5. The method of claim 1 including assigning the bits zero through thirty-one, using bits seven through five to indicate the operation type, assigning the bits eleven through eight to indicate the coprocessor number, assigning the bits 23 and 22 to indicate the operand size, and assigning the bits 21 and 20 to set the saturation type.

6. The method of claim 1 including assigning the bits 27 to 24 to be 1110.

7. The method of claim 1 including conditionally executing the coprocessor instruction dependent on a state of a main processor arithmetic flag.

8. The method of claim 1 including providing an instruction to broadcast a data element from a main processor source register to a coprocessor destination register.

9. An article comprising a medium storing instructions that, if executed, enable a processor-based system to:
perform data processing using a main processor in response to a stream of data processing instructions, said data processing instructions including at least one coprocessor instruction;
use a source register in said main processor and one destination register in said coprocessor, said register including data elements; and
handle a coprocessor instruction that includes an opcode specifying a data processing operation to be performed by the coprocessor and a coprocessor identification field for identifying a target coprocessor for the coprocessor instruction, said instruction to broadcast a data element from said source register to said destination register.

10. The article of claim 9 further storing instructions that, if executed, enable a processor-based system to provide an instruction to broadcast a data element to all elements of said destination register.

11. The article of claim 9 further storing instructions that, if executed, enable a processor-based system to provide an instruction to specify the size of the data element to be broadcast.

12. The article of claim 9 further storing instructions that, if executed, enable a processor-based system to provide an instruction to selectively specify one of eight, sixteen, or thirty-two bit data elements to be broadcast.

13. The article of claim 9 further storing instructions that, if executed, enable the processor-based system to handle an instruction to assign the bits zero through thirty-one, use bits seven through five to indicate the operation type, assign the bits eleven through eight to indicate the coprocessor number, assign the bits twenty-three and twenty-two to indicate the operand size, and assign the bits twenty-one and twenty to set the saturation type.

14. The article of claim 9 further storing instructions that, if executed, enable the processor-based system to conditionally execute the coprocessor instruction dependent on a state of a main processor arithmetic flag.

15. A processor comprising:
a main processor including a source register; and
a coprocessor coupled to said main processor, said coprocessor to use opcodes specifying a data processing operation to be performed by the coprocessor and a coprocessor identification field for identifying a target coprocessor for coprocessor instructions, said coprocessor including a destination register for a coprocessor instruction, said registers including data elements, said coprocessor including an instruction to broadcast a data element from said source register to said destination register.

16. The processor of claim 15 wherein said processor is a single instruction multiple data coprocessor.

17. The processor of claim 15 wherein said coprocessor uses instructions having bits zero through thirty-one, and wherein bits seven through five indicate the operation type, bits eleven through eight indicate the coprocessor number, bits twenty-three and twenty-two indicate the operand size, and bits twenty-one and twenty set the saturation type.

18. The processor of claim 15 wherein said instruction to broadcast a data element to all elements of said destination register.

19. The processor of claim 15 wherein said instruction specifies the size of the data element to be broadcast.

20. The processor of claim 19 wherein said instructions selectively specify one of eight, sixteen, or thirty-two bit data elements to be broadcast.

21. The processor of claim 15 wherein said coprocessor includes said destination register and said main processor including the source registers.

22. A system comprising:
   a main processor including a source register; and
   a coprocessor coupled to said main processor, said coprocessor to use opcodes specifying a data processing operation to be performed by the coprocessor and a coprocessor identification field for identifying a target coprocessor for coprocessor instructions, said coprocessor to allocate a destination register for a coprocessor instruction, said registers including data elements, said instruction to broadcast a data element from said source register to an element of said destination register; and
   a wireless interface coupled to said main processor.

23. The system of claim 22 wherein said coprocessor instructions have bits twenty-seven to twenty-four that are 1110.

24. The system of claim 22 wherein said coprocessor uses the instructions zero through thirty-one, with bits seven through five indicating the operation type, bits eleven through eight indicating the coprocessor number, the bits twenty-three and twenty-two indicating the operand size and the bits twenty-one to twenty setting the saturation type.

25. The system of claim 22 wherein said instruction to transfer a data element from said source register to all elements of said destination register.

26. The system of claim 22 wherein said instruction to specify the size of the data element to be broadcast.

27. The system of claim 26 wherein said instruction to selectively specify one of eight, sixteen, or thirty-two bit data elements to broadcast.

* * * * *